United States Patent
Aiba et al.

(10) Patent No.: US 12,232,137 B2
(45) Date of Patent: Feb. 18, 2025

(54) USER EQUIPMENTS, BASE STATIONS AND METHODS FOR CONFIGURABLE DOWNLINK CONTROL INFORMATION FOR DEMODULATION REFERENCE SIGNAL FOR A PHYSICAL UPLINK SHARED CHANNEL

(71) Applicant: SHARP KABUSHIKI KAISHA, Sakai (JP)

(72) Inventors: Tatsushi Aiba, Sakai (JP); Kai Ying, Vancouver, WA (US); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 343 days.

(21) Appl. No.: 17/772,684

(22) PCT Filed: Sep. 25, 2020

(86) PCT No.: PCT/JP2020/036441
§ 371 (c)(1),
(2) Date: Apr. 28, 2022

(87) PCT Pub. No.: WO2021/090604
PCT Pub. Date: May 14, 2021

(65) Prior Publication Data
US 2023/0007680 A1    Jan. 5, 2023

Related U.S. Application Data

(60) Provisional application No. 62/931,973, filed on Nov. 7, 2019.

(51) Int. Cl.
*H04W 72/12*     (2023.01)
*H04L 5/00*      (2006.01)
*H04W 72/23*     (2023.01)

(52) U.S. Cl.
CPC .......... *H04W 72/23* (2023.01); *H04L 5/0051* (2013.01)

(58) Field of Classification Search
None
See application file for complete search history.

(56) References Cited

U.S. PATENT DOCUMENTS 8,995,347 B2    3/2015 Nam et al.
9,179,456 B2   11/2015 Han et al.
(Continued)

OTHER PUBLICATIONS

"3rd Generation Partnership Project; Technical Specification Group Radio Access Network; NR; Radio Resource Control (RRC) protocol specification(Release 15)", 3GPP TS 38.331 V15.7.0 (Sep. 2019).

(Continued)

*Primary Examiner* — Pamit Kaur
(74) *Attorney, Agent, or Firm* — ScienBiziP, P.C.

(57) ABSTRACT

A user equipment (UE) is described. The UE includes transmitting circuitry configured to transmit a demodulation reference signal (DMRS) for a physical uplink shared channel (PUSCH). In a case that a number of bits for downlink control information (DCI) used for indicating an index of an uplink antenna port(s) is more than 1 bit, the DMRS for the PUSCH is transmitted using the index of an uplink antenna port(s) indicated by using the DCI used for indicating the index of the uplink antenna port(s). In a case that a number of bits for downlink control information (DCI) used for indicating an index of an uplink antenna port(s) is 0 bit, the DMRS for the PUSCH is transmitted using an index of the uplink antenna port(s) configured by using first information.

5 Claims, 11 Drawing Sheets

(56) References Cited

U.S. PATENT DOCUMENTS

2014/0307646 A1\* 10/2014 Chen .................... H04W 72/02
370/329
2021/0044467 A1\* 2/2021 Xi ........................ H04L 5/0007
2022/0330254 A1\* 10/2022 Gao ..................... H04L 5/0051

OTHER PUBLICATIONS

"3rd Generation Partnership Project; Technical Specification Group Radio Access Network; NR; Physical layer procedures for data(Release 15)", 3GPP TS 38.214 V15.7.0 (Sep. 2019).

"3rd Generation Partnership Project; Technical Specification Group Radio Access Network; NR; Physical layer procedures for control(Release 15)", 3GPP TS 38.213 V15.7.0 (Sep. 2019).

"3rd Generation Partnership Project; Technical Specification Group Radio Access Network; NR; Physical channels and modulation(Release 15)", 3GPP TS 38.211 V15.7.0 (Sep. 2019).

"3rd Generation Partnership Project; Technical Specification Group Radio Access Network; NR; Multiplexing and channel coding(Release 15)", 3GPP TS 38.212 V15.7.0 (Sep. 2019).

Intel Corporation, "On PDCCH enhancements for URLLC", R1-1910660, 3GPP TSG RAN WG1 #98bis, Chongqing, China, Oct. 14-20, 2019.

\* cited by examiner

Supported Transmission Numerologies 201

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot 203

| | | Slot configuration | | | | |
|---|---|---|---|---|---|---|
| | | 0 | | | 1 | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

USER EQUIPMENTS, BASE STATIONS AND METHODS FOR CONFIGURABLE DOWNLINK CONTROL INFORMATION FOR DEMODULATION REFERENCE SIGNAL FOR A PHYSICAL UPLINK SHARED CHANNEL

CROSS REFERENCE

This Nonprovisional application claims priority under 35 U.S.C. § 119 on provisional Application No. 62/931,973 on Nov. 7, 2019, the entire contents of which are hereby incorporated by reference.

TECHNICAL FIELD

The present disclosure relates generally to communication systems. More specifically, the present disclosure relates to user equipment (UE), base stations, and methods for configurable downlink control information for demodulation reference signal for a physical uplink shared channel.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) comprises: receiving circuitry configured to receive a radio resource control (RRC) message comprising information used for indicating whether or not an antenna port field is present in a downlink control information (DCI) format, the DCI format being used for scheduling of a physical downlink shared channel (PDSCH); and processing circuitry configured to determine whether or not the information indicates that the antenna port field is present in the DCI format, wherein in a case that the antenna port field is not present in the DCI format, the receiving circuitry is configured to receive the DMRS for the PDSCH using an antenna port(s) with an index value 0 in a corresponding table.

In one example, a base station apparatus comprises: generating circuitry configured to generate a radio resource control (RRC) message comprising information used for indicating whether or not an antenna port field is present in a downlink control information (DCI) format, the DCI format being used for scheduling of a physical downlink shared channel (PDSCH); and transmitting circuitry configured to transmit the RRC message, wherein in a case that the antenna port field is not present in the DCI format, the transmitting circuitry is configured to transmit the DMRS for the PDSCH using an antenna port(s) with an index value 0 in a corresponding table.

In one example, a communication method of a user equipment (UE) comprises: receiving a radio resource control (RRC) message comprising information used for indicating whether or not an antenna port field is present in a downlink control information (DCI) format, the DCI format being used for scheduling of a physical downlink shared channel (PDSCH); and processing circuitry configured to determine whether or not the information indicates that the antenna port field is present in the DCI format wherein in a case that the antenna port field is not present in the DCI format, the receiving circuitry is configured to receive the DMRS for the PDSCH using an antenna port(s) with an index value 0 in a corresponding table.

In one example, a communication method of a base station apparatus comprises: generating circuitry configured to generate a radio resource control (RRC) message comprising information used for indicating whether or not an antenna port field is present in a downlink control information (DCI) format, the DCI format being used for scheduling of a physical downlink shared channel (PDSCH); and transmitting circuitry configured to transmit the RRC message, wherein in a case that the antenna port field is not present in the DCI format, the transmitting circuitry is configured to transmit the DMRS for the PDSCH using an antenna port(s) with an index value 0 in a corresponding table.

BRIEF DESCRIPTION OF DRAWINGS

FIG. 2 shows examples of multiple numerologies.

DESCRIPTION OF EMBODIMENTS

Figure 1:
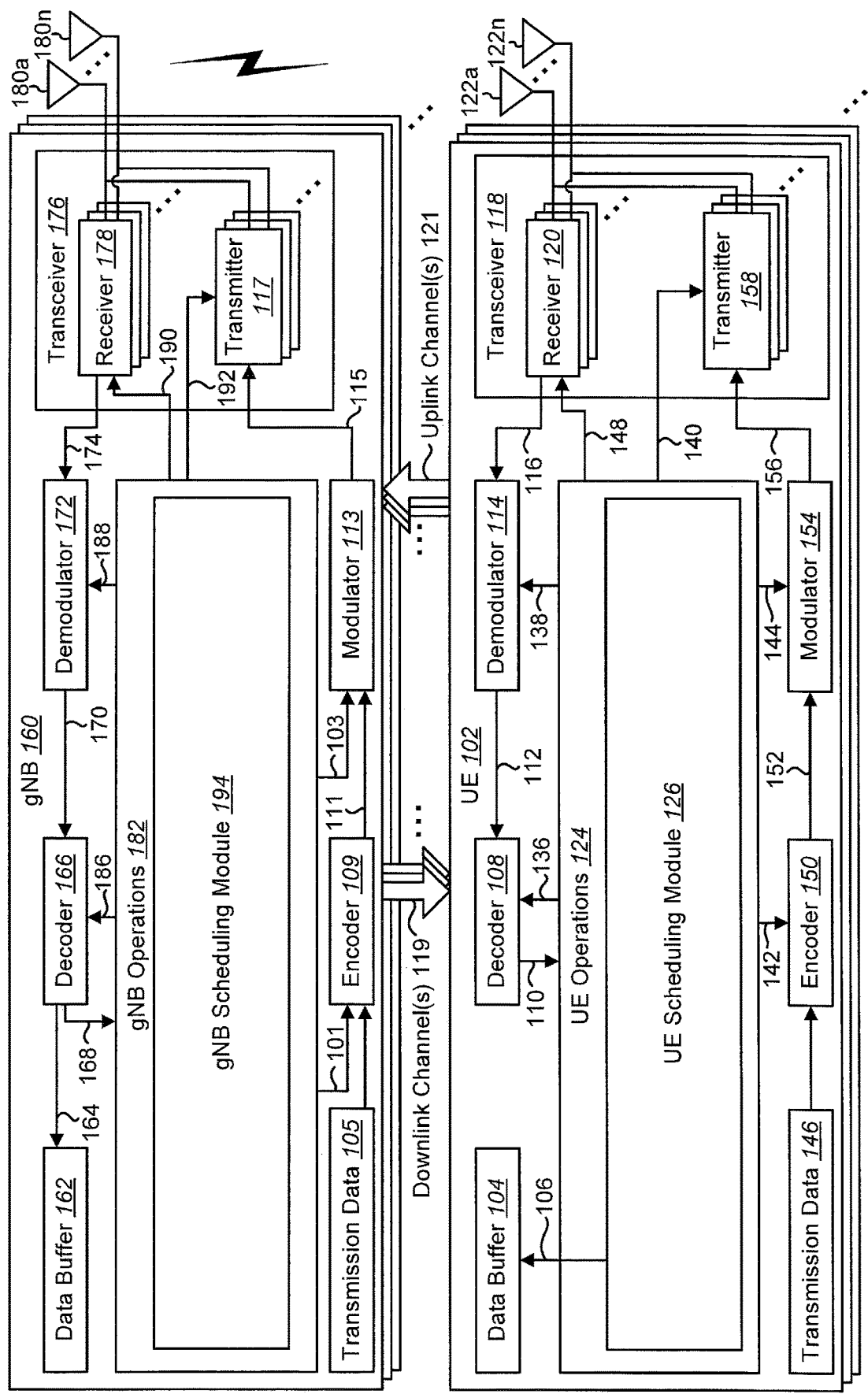
FIG. 1 is a block diagram illustrating one implementation of one or more gNBs and one or more UEs in which systems and methods for signaling may be implemented.

A user equipment (UE) is described. The UE includes receiving circuitry configured to receive a radio resource control (RRC) message comprising first information used for indicating an index of an uplink antenna port(s). The receiving circuitry further configured to receive on a physical downlink control channel (PDCCH), downlink control information (DCI) format comprising DCI used for indicating an index of the uplink antenna port(s). The DCI format is used for scheduling of a physical uplink shared channel (PUSCH). The UE further includes transmitting circuitry configured to transmit demodulation reference signal (DMRS) for the PUSCH. In a case that a number of bits for the DCI used for indicating the index of the uplink antenna port(s) is more than 1 bit, the transmitting circuitry is configured to transmit the DMRS for the PUSCH using the uplink antenna port(s) indicated by using the DCI used for indicating the index of the uplink antenna port(s). In a case that the number of bits for the DCI used for indicating the index of the uplink antenna port(s) is 0 bit, the transmitting circuitry is configured to transmit the DMRS for the PUSCH using the uplink antenna port(s) configured by using the first information.

A base station apparatus is described. The base station apparatus includes transmitting circuitry configured to transmit a radio resource control (RRC) message comprising first information used for indicating an index of an uplink antenna port(s). The transmitting circuitry is further configured to transmit on a physical downlink control channel (PDCCH), downlink control information (DCI) format comprising DCI used for indicating an index of the uplink antenna port(s). The DCI format being used for scheduling of a physical uplink shared channel (PUSCH). The UE further includes receiving circuitry configured to receive demodulation reference signal (DMRS) for the PUSCH. In a case that a number of bits for the DCI used for indicating the index of the uplink antenna port(s) is more than 1 bit, the receiving circuitry is configured to receive the DMRS for the PUSCH using the uplink antenna port(s) indicated by using the DCI used for indicating the index of the uplink antenna port(s). In a case that the number of bits for the DCI used for indicating the index of the uplink antenna port(s) is 0 bit, the receiving circuitry is configured to receive the DMRS for the PUSCH using the uplink antenna port(s) configured by using the first information.

A communication method of a user equipment (UE) is described. The communication method includes receiving a radio resource control (RRC) message comprising first information used for indicating an index of an uplink antenna port(s). The communication method further includes receiving on a physical downlink control channel (PDCCH), downlink control information (DCI) format comprising DCI used for indicating an index of the uplink antenna port(s). The DCI format is used for scheduling of a physical uplink shared channel (PUSCH). The communication method further includes transmitting demodulation reference signal (DMRS) for the PUSCH. In a case that a number of bits for the DCI used for indicating the index of the uplink antenna port(s) is more than 1 bit, transmitting the DMRS for the PUSCH using the uplink antenna port(s) indicated by using the DCI used for indicating the index of the uplink antenna port(s). In a case that the number of bits for the DCI used for indicating the index of the uplink antenna port(s) is 0 bit, transmitting the DMRS for the PUSCH using the uplink antenna port(s) configured by using the first information.

A communication method of a base station apparatus is described. The communication method includes transmitting a radio resource control (RRC) message comprising first information used for indicating an index of an uplink antenna port(s). The communication method further includes transmitting on a physical downlink control channel (PDCCH), downlink control information (DCI) format comprising DCI used for indicating an index of the uplink antenna port(s). The DCI format being used for scheduling of a physical uplink shared channel (PUSCH). The communication method further includes receiving demodulation reference signal (DMRS) for the PUSCH. In a case that a number of bits for the DCI used for indicating the index of the uplink antenna port(s) is more than 1 bit, receiving the DMRS for the PUSCH using the uplink antenna port(s) indicated by using the DCI used for indicating the index of the uplink antenna port(s). In a case that the number of bits for the DCI used for indicating the index of the uplink antenna port(s) is 0 bit, receiving the DMRS for the PUSCH using the uplink antenna port(s) configured by using the first information.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), 5G New Radio (5th Generation NR) and other standards (e.g., 3GPP Releases 8, 9, 10, 11, 12, 13, 14 and/or 15). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In de-scribing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a gNB, a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell (e.g., serving cell)" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell (e.g., serving cell)" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. And, in NR, transmissions for different services may be specified (e.g., configured) for one or more bandwidth parts (BWPs) in a serving cell and/or for one or more serving cells. A user equipment (UE) may perform a reception(s) of a downlink signal(s) and/or a transmission(s) of an uplink signal(s) in the BWP(s) of the serving cell(s).

In order for the services to use the time, frequency, and/or space resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for signaling may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDCCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink physical shared channel (PSCH) (e.g., PUSCH) resource).

In another example, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). The CSI may include aperiodic CSI (e.g., transmitted on the PUSCH), semi-persistent CSI (e.g., transmitted on the PUSCH and/or the PUCCH), and/or periodic CSI (e.g., transmitted on the PUSCH and/or the PUCCH). Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, a physical downlink control channel (PDCCH) may be defined. The PDCCH may be used for transmitting downlink control information (DCI). Here, more than one DCI formats may be defined for DCI transmission on the PDCCH. Namely, fields may be defined in the DCI format(s), and the fields are mapped to the information bits (e.g., DCI bits).

For example, a DCI format 1_0 that is used for scheduling of the PDSCH in the cell may be defined as the DCI format for the downlink. Also, as described herein one or more Radio Network Temporary Identifiers (e.g., the Cell RNTI(s) (C-RNTI(s)), the Configured Scheduling RNTI(s) (CS-RNTI(s)), the System Information RNTI(s) (SI-RNTI(s)), the Random Access RNTI(s) (RA-RNTI(s)), the MCS-C-RNTI (Modulation and Coding Scheme-C-RNTI), and/or a first RNTI may be used to transmit the DCI format 1_0. Also, the DCI format 1_0 may be monitored (e.g., transmitted, mapped) in the Common Search Space (CSS) and/or the UE Specific Search space (USS). Alternatively, the DCI format 1_0 may be monitored (e.g., transmitted, mapped) in the CSS only.

For example, the DCI included in the DCI format 1_0 may be a frequency domain resource assignment (e.g., for the PDSCH). Additionally or alternatively, the DCI included in the DCI format 1_0 may be a time domain resource assignment (e.g., for the PDSCH). Additionally or alternatively, the DCI included in the DCI format 1_0 may be a modulation and coding scheme (e.g., for the PDSCH). Additionally or alternatively, the DCI included in the DCI format 1_0 may be a priority indicator.

Additionally or alternatively, a DCI format 1_1 that is used for scheduling of the PDSCH in the cell may be defined as the DCI format for the downlink. Additionally or alternatively, the C-RNTI, the CS-RNTI, the MCS-C-RNTI, and/or the first RNTI may be used to transmit the DCI format 1_1. Additionally or alternatively, the DCI format 1_1 may be monitored (e.g., transmitted and/or mapped) in the CSS and/or the USS.

For example, the DCI included in the DCI format 1_1 may be a BWP indicator (e.g., for the PDSCH). Additionally or alternatively, the DCI included in the DCI format 1_1 may be frequency domain resource assignment (e.g., for the PDSCH). Additionally or alternatively, the DCI included in the DCI format 1_1 may be a time domain resource assignment (e.g., for the PDSCH). Additionally or alternatively, the DCI included in the DCI format 1_1 may be a modulation and coding scheme (e.g., for the PDSCH). Additionally or alternatively, the DCI included in the DCI format 1_1 may be a priority indicator. Additionally or alternatively, the DCI included in the DCI format 1_1 may be DCI used for indicating an antenna port(s) (i.e., a downlink antenna port(s)) (e.g., an index (indices) of the antenna port(s), a number(s) of the antenna port(s)). Additionally or alternatively, the DCI included in the DCI format 1_1 may be DCI used for indicating demodulation reference signal(s) (DMRS(s)) sequence initialization. Namely, the DCI included in the DCI format 1_1 may be used for indicating a sequence initialization for the DMRS(s) for the PDSCH, as described in detail below.

Additionally or alternatively, the DCI (e.g., the number of bits (e.g., the number of bit field(s))) included in the DCI format 1_1 may be configurable. For example, for each DCI (i.e., the DCI included in the DCI format 1_1), the gNB 160 may configure information used for indicating (e.g., determining) the number of bits. For example, the gNB 160 may transmit, by using the RRC message (e.g., the dedicated RRC message), the information (e.g., one or more parameters) used for indicating (e.g., determining) the number of bits for each DCI (i.e., the DCI included in the DCI format 1_1). Namely, each of the information (e.g., each of the one or more parameters) may be used for indicating (e.g., determining) the number of bits for each DCI, respectively.

For example, the number of bits for the BWP indicator included in the DCI format 1_1 may be 0, 1, or 2 bits. Additionally or alternatively, the number of bits for the frequency domain resource assignment included in the DCI format 1_1 may be determined based on the number of the active DL BWP(s) which is configured by using information (e.g., transmitted by using the RRC message). Additionally or alternatively, the number of bits for the time domain resource assignment included in the DCI format 1_1 may be 0, 1, 2, 3, or, 4 bits. Additionally or alternatively, the number of bits for the modulation and coding scheme included in the DCI format 1_1 may be 5 bits. Additionally or alternatively, the number of bits for the priority indicator included in the DCI format 1_1 may be 1 bit (i.e., always 1 bit). Additionally or alternatively, the number of bits for the priority indicator included in the DCI format 1_1 may be 0 or 1 bit (i.e., the gNB 160 may transmit, e.g., by using the RRC message, information used for configuring (e.g., determining) the number of bits for the priority indicator). Additionally or alternatively, the number of bits for the DCI used for indicating the antenna port(s) (e.g., the index (indices) of the antenna port(s), the number(s) of the antenna port(s)) included in the DCI format 1_1 may be 4, 5, or 6 bits. Namely, the number of bits for the DCI used for indicating the antenna port(s) included in the DCI format 1_1 may not be "0" bit (i.e., may not be configured as "0" bit). Additionally or alternatively, the number of bits for the DCI used for indicating the DMRS sequence initialization included in the DCI format 1_1 may be 1 bit (i.e., always 1 bit). Namely, the number of bits for the DMRS sequence initialization included in the DCI format 1_1 may not be "0" bit (i.e., may not be configured as "0" bit).

Additionally or alternatively, a DCI format 1_X that is used for scheduling of the PDSCH in the cell may be defined as the DCI format for the downlink. Additionally or alternatively, the C-RNTI, the CS-RNTI, the MCS-C-RNTI, and/or the first RNTI may be used to transmit the DCI format 1_X. Additionally or alternatively, the DCI format 1_X may be monitored (e.g., transmitted and/or mapped) in the CSS and/or the USS.

For example, the DCI included in the DCI format 1_X may be a BWP indicator (e.g., for the PDSCH). Additionally or alternatively, the DCI included in the DCI format 1_X may be frequency domain resource assignment (e.g., for the PDSCH). Additionally or alternatively, the DCI included in the DCI format 1_X may be a time domain resource assignment (e.g., for the PDSCH). Additionally or alternatively, the DCI included in the DCI format 1_X may be a modulation and coding scheme (e.g., for the PDSCH). Additionally or alternatively, the DCI included in the DCI format 1_X may be a priority indicator. Additionally or alternatively, the DCI included in the DCI format 1_X may be DCI used for indicating an antenna port(s) (i.e., a downlink antenna port(s)) (e.g., an index (indices) of the antenna port(s), a number(s) of the antenna port(s)). Additionally or alternatively, the DCI included in the DCI format 1_X may be DCI used for indicating demodulation reference signal(s) (DMRS(s)) sequence initialization. Namely, the DCI included in the DCI format 1_X may be used for indicating a sequence initialization for the DMRS(s) for the PDSCH, as described in detail below.

Additionally or alternatively, the DCI (e.g., the number of bits (e.g., the number of bit field(s))) included in the DCI format 1_X may be configurable. For example, for each DCI (i.e., the DCI included in the DCI format 1_X), the gNB 160 may configure information used for indicating (e.g., determining) the number of bits. For example, the gNB 160 may transmit, by using the RRC message (e.g., the dedicated RRC message), the information (e.g., one or more parameters) used for indicating (e.g., determining) the number of bits for each DCI (i.e., the DCI included in the DCI format 1_X). Namely, each of the information (e.g., each of the one or more parameters) may be used for indicating (e.g., determining) the number of bits for each DCI, respectively.

For example, the number of bits for the BWP indicator included in the DCI format 1_X may be 0, 1, or 2 bits. Additionally or alternatively, the number of bits for the frequency domain resource assignment included in the DCI format 1_X may be determined based on the number of the active DL BWP(s) which is configured by using information (e.g., transmitted by using the RRC message). Additionally or alternatively, the number of bits for the time domain resource assignment included in the DCI format 1_X may be 0, 1, 2, 3, or, 4 bits. Additionally or alternatively, the number of bits for the modulation and coding scheme included in the DCI format 1_X may be 5 bits. Additionally or alternatively, the number of bits for the priority indicator included in the DCI format 1_X may be 1 bit (i.e., always 1 bit). Additionally or alternatively, the number of bits for the priority indicator included in the DCI format 1_X may be 0 or 1 bit (i.e., the gNB 160 may transmit, e.g., by using the RRC message, information used for configuring (e.g., determining) the number of bits for the priority indicator). Additionally or alternatively, the number of bits for the DCI used for indicating the antenna port(s) (e.g., the index (indices) of the antenna port(s), the number(s) of the antenna port(s)) included in the DCI format 1_X may be 0, 4, 5, or 6 bits. Namely, the number of bits for the DCI used for indicating the antenna port(s) included in the DCI format 1_X may be "0" bit (i.e., may be configured as "0" bit). Additionally or alternatively, the number of bits for the DCI used for indicating the DMRS sequence initialization included in the DCI format 1_X may be 0, or 1 bit. Namely, the number of bits for the DMRS sequence initialization included in the DCI format 1_X may be "0" bit (i.e., may be configured as "0" bit).

For example, the gNB 160 may transmit, e.g., by using the RRC message, information used for configuring (e.g., determining) 4, 5, or 6 bits for the DCI used for indicating the antenna port(s) included in the DCI format 1_1 and/or the DCI format 1_X. Namely, for the DCI used for indicating the antenna port(s) included in the DCI format 1_1 and the DCI format 1_X, the gNB 160 may commonly configure the number of bits (e.g., 4, 5, or 6 bits) (e.g., by using the information (e.g., a single information)). For example, the number of bits (e.g., 4, 5, or 6 bits) may be defined (e.g., configured, determined) by using Tables 1, 2, 3, and/or 4.

TABLE 1

Antenna port(s) (1000 + DMRS port), dmrs-Type=1, maxLength=1

One Codeword:
Codeword 0 enabled,
Codeword 1 disabled

| Value | Number of DMRS CDM group(s) without data | DMRS port(s) |
| --- | --- | --- |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |

TABLE 1-continued

Antenna port(s) (1000 + DMRS port), dmrs-Type=1, maxLength=1

One Codeword:
Codeword 0 enabled,
Codeword 1 disabled

| Value | Number of DMRS CDM group(s) without data | DMRS port(s) |
|---|---|---|
| 10 | 2 | 0-3 |
| 11 | 2 | 0, 2 |
| 12-15 | Reserved | Reserved |

TABLE 2

Antenna port(s) (1000 + DMRS port), dmrs-Type = 1, maxLength = 2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | Reserved | reserved | Reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 3

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0,1 | 2-31 | Reserved | reserved |
| 3 | 2 | 0 | | | |
| 4 | 2 | 1 | | | |
| 5 | 2 | 2 | | | |
| 6 | 2 | 3 | | | |
| 7 | 2 | 0,1 | | | |
| 8 | 2 | 2,3 | | | |
| 9 | 2 | 0-2 | | | |
| 10 | 2 | 0-3 | | | |
| 11 | 3 | 0 | | | |
| 12 | 3 | 1 | | | |

TABLE 3-continued

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 13 | 3 | 2 | | | |
| 14 | 3 | 3 | | | |
| 15 | 3 | 4 | | | |
| 16 | 3 | 5 | | | |
| 17 | 3 | 0,1 | | | |
| 18 | 3 | 2,3 | | | |
| 19 | 3 | 4,5 | | | |
| 20 | 3 | 0-2 | | | |
| 21 | 3 | 3-5 | | | |
| 22 | 3 | 0-3 | | | |
| 23 | 2 | 0,2 | | | |
| 24-31 | Reserved | Reserved | | | |

TABLE 4

Antenna port(s) (1000 + DMRS port), dmrs-Type = 2, maxLength = 2

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |

TABLE 4-continued

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Here, for Table 1, 2, 3, and/or 4, dmrs-Type may be information (e.g., first information) transmitted from the gNB 160 to the UE 102 by using the RRC message. Namely, for example, the gNB 160 may transmit, by using the RRC message, the first information. For example, the first information may be used for selection of a DMRS type to be used for DL (e.g., the PDSCH, the PDSCH transmission). For example, the UE 102 may assume that the DMRS for the PDSCH being mapped to physical resources (e.g., resource element(s)) based on the first information. Namely, a position(s) of the physical resource to which the DMRS for the PDSCH is mapped (e.g., a position of the DMRS for the PDSCH) may be determined based on the first information. Here, in a case that the first information is not configured (e.g., in a case that a field of the first information is absent (e.g., in a case that the first information is not present)), dmrs-Type=1 may be used (e.g., the UE may use dmrs-Type=1).

Additionally or alternatively, for Table 1, 2, 3, and/or 4, maxLength may be information (e.g., second information) transmitted from the gNB 160 to the UE 102 by using the RRC message. Namely, for example, the gNB 160 may transmit, by using the RRC message, the second information. For example, the second information may be used for configuring (e.g., indicating) the maximum number of OFDM symbols for the DMRS for the PDSCH (e.g., DL front loaded DMRS (e.g., for the PDSCH)). For example, the UE 102 may determine a position(s) of a time domain of the DMRS for the PDSCH (e.g., duration for the DMRS for the PDSCH) based on the second information. Namely, a position(s) of the DMRS for the PDSCH may be determined based on the second information. Here, in a case that the second information is not configured (e.g., in a case that a field of the second information is absent (e.g., in a case that the second information is not present)), maxLength=1 may be used (e.g., the UE may use maxLength=1).

As described, the number of bits for the DCI used for indicating the antenna ports(s) included in the DCI format 1_1 and/or the DCI format 1_X may be defined (e.g., configured) based on Tables 1, 2, 3, and/or 4. Namely, the number of bits for the DCI used for indicating the antenna port(s) included in the DCI format 1_1 and/or the DCI format 1_X may be determined based on the first information and/or the second information. For example, in a case that the first information (i.e., dmrs-Type)=1 is configured and the second information (i.e., maxLength)=1 is configured, the number of bits for the DCI used for indicating the antenna port(s) included in the DCI format 1_1 and/or the DCI format 1_X may be 4 bits. Additionally or alternatively, in a case that the first information (i.e., dmrs-Type)=1 is configured and the second information (i.e., maxLength)=2 is configured, the number of bits for the DCI used for indicating the antenna port(s) included in the DCI format 1_1 and/or the DCI format 1_X may be 5 bits. Additionally or alternatively, in a case that the first information (i.e., dmrs-Type)=2 is configured and the second information (i.e., maxLength)=1 is configured, the number of bits for the DCI used for indicating the antenna port(s) included in the DCI format 1_1 and/or the DCI format 1_X may be 5 bits. Additionally or alternatively, in a case that the first information (i.e., dmrs-Type)=2 is configured and the second information (i.e., maxLength)=2 is configured, the number of bits for the DCI used for indicating the antenna port(s) included in the DCI format 1_1 and/or the DCI format 1_X may be 6 bits.

Additionally or alternatively, as described above, for the DCI format 1_X, the gNB 160 may transmit, by using the RRC message, information (e.g., third information) used for configuring 0 bit for the number of bits for the DCI used for indicating the antenna port(s). For example, as the third information, the gNB 160 may transmit information used for configuring (e.g., indicating) 0 bit for the number of bits for the DCI used for indicating the antenna port(s) included in the DCI format 1_X. Namely, in a case that the third information (e.g., the information used for configuring 0 bit for the number of bits for the DCI used for indicating the antenna port(s)) is not configured, 4, 5, or 6 bits (e.g., determined based on the first information and the second information, as described above) may be used (e.g., configured, indicated) for the number of bits for the DCI used for indicating the antenna port(s) included in the DCI format 1_X. Additionally or alternatively, as the third information, the gNB 160 may transmit information used for configuring whether the number of bits for the DCI used for indicating the antenna port(s) included in the DCI format 1_X is 0 bit or more than 0 bit (e.g., 4, 5, or 6 bits). For example, as the third information, the gNB 160 may transmit the information used for configuring true (i.e., the number of bits for the DCI used for indicating the antenna port(s) included in the DCI format 1_X is 0 bit) or false (i.e., the number of bits for the DCI used for indicating the antenna port(s) included in the DCI format 1_X is more than 0 bit (e.g., 4, 5, or 6 bits)). And, in a case that the false (i.e., the number of bits for the DCI used for indicating the antenna port(s) included in the DCI format 1_X is more than 0 bit (e.g., 4, 5, or 6 bits)) is configured, the UE 102 may determine the number of bits for the DCI used for indicating the antenna port(s) included in the DCI format 1_X based on the first information and the second information, as described above. Additionally or alternatively, for the DCI format 1_X, in a case that the first information is not configured and/or the second information is not configured, the number of bits for the DCI used for indicating the antenna port(s) included in the DCI format 1_X may be considered (e.g., assumed) as 0 bit (e.g., 0 bis may be used, the UE 102 may use 0 bit). Namely, for the DCI format 1_1, in a case that the first information is not configured, dmrs-Type=1 may be used (e.g., the UE may use dmrs-Type=1). Additionally or alternatively, for the DCI format 1_1, in a case that the second information is not configured, maxLength=1 may be used (e.g., the UE may use maxLength=1).

Additionally or alternatively, as described above, for the DCI format 1_X, the gNB 160 may transmit, by using the RRC message, information (e.g., fourth information) used for configuring 0 bit for the number of bits for the DCI used for indicating the DMRS sequence initialization. For example, as the fourth information, the gNB 160 may transmit information used for configuring (e.g., indicating) 0 bit for the number of bits for the DCI used for indicating the DMRS sequence initialization included in the DCI format 1_X. Namely, in a case that the fourth information (e.g., the information used for configuring 0 bit for the number of bits for the DCI used for indicating the DMRS sequence initialization) is not configured, 1 bit may be used (e.g., configured, indicated) for the number of bits for the DCI used for indicating the DMRS sequence initialization included in the DCI format 1_X. Additionally or alternatively, as the fourth information, the gNB 160 may transmit information used for configuring whether the number of bits for the DCI used for indicating the DMRS sequence initialization included in the DCI format 1_X is 0 bit or 1 bit. For example, as the fourth information, the gNB 160 may transmit the information used for configuring true (i.e., the number of bits for the DCI used for indicating the DMRS sequence initialization included in the DCI format 1_X is 0 bit) or false (i.e., the number of bits for the DCI used for indicating the DMRS sequence initialization included in the DCI format 1_X is 1 bit).

Additionally or alternatively, the gNB 160 may transmit, by using the RRC message, information used for generating a sequence of the DMRS for the PDSCH. For example, the information may include information used for indicating an scrambling identity (e.g., scramblingID0) for the DMRS for the PDSCH. Here, the scrambling identity may be the DMRS scrambling initialization. Additionally or alternatively, in a case that the information used for indicating an scrambling identity (e.g., scramblingID0) is not configured (e.g., in a case that a field of the information used for indicating the scrambling identity (e.g., scramblingID0) is absent (e.g., in a case that the information used for indicating the scrambling identity (e.g., scramblingID0) is not present)), a physical cell identity may be used (e.g., the UE 102 may use a physical cell identity). Additionally or alternatively, the information may include information used for indicating an scrambling identity (e.g., scramblingID1) for the DMRS for the PDSCH. Additionally or alternatively, in a case that the information used for indicating an scrambling identity (e.g., scramblingID1) is not configured (e.g., in a case that a field of the information used for indicating the scrambling identity (e.g., scramblingID1) is absent (e.g., in a case that the information used for indicating the scrambling identity (e.g., scramblingID1) is not present)), a physical cell identity may be used (e.g., the UE 102 may use a physical cell identity). Here, for the DMRS for the PDSCH (e.g., for the generation of the sequence of the DMRS for the PDSCH), the scrambling identity (e.g., scramblingID1 and/or scramblingID1) may be included in the DMRS-DownlinkConfig IE (i.e., Information Element).

Additionally or alternatively, a DCI format 0_0 that is used for scheduling of the PUSCH in the cell may be defined as the DCI format for the uplink. Additionally or alternatively, the C-RNTI, the CS-RNTI, the Temporary C-RNTI, the MCS-C-RNTI and/or the first RNTI may be used to transmit the DCI format 0_0. Additionally or alternatively, the DCI format 0_0 may be monitored (e.g., transmitted, mapped) in the CSS and/or the USS. Alternatively, the DCI format 0_0 may be monitored (e.g., transmitted, mapped) in the CSS only.

For example, the DCI included in the DCI format 0_0 may be a frequency domain resource assignment (e.g., for the PUSCH). Additionally or alternatively, the DCI included in the DCI format 0_0 may be a time domain resource assignment (e.g., for the PUSCH). Additionally or alternatively, the DCI included in the DCI format 0_0 may be a modulation and coding scheme (e.g., for the PUSCH). Additionally or alternatively, the DCI included in the DCI format 0_0 may be a priority indicator.

Additionally or alternatively, a DCI format 0_1 that is used for scheduling of the PUSCH in the cell may be defined as the DCI format for the uplink. Here, the DCI format 0_1 may be described as a first DCI format 601. Additionally or alternatively, the C-RNTI, the CS-RNTI, and/or the MCS-C-RNTI may be used to transmit the DCI format 0_1 (i.e., the first DCI format 601). Namely, the first DCI format 601 may be the DCI format 0_1 with the CRC scrambled by the C-RNTI, CS-RNTI, and/or the MCS-C-RNTI. Here, as described below, the DCI format 0_1 with the CRC scrambled by the MCS-C-RNTI and/or the first RNTI may be a second DCI format 603. Additionally or alternatively, the DCI format 0_1 (i.e., the first DCI format 601) may be monitored (e.g., transmitted, mapped) in the CSS and/or the USS.

For example, the DCI included in the DCI format 0_1 may be a BWP indicator (e.g., for the PUSCH). Additionally or alternatively, the DCI included in the DCI format 0_1 may be a frequency domain resource assignment (e.g., for the PUSCH). Additionally or alternatively, the DCI included in the DCI format 0_1 may be a time domain resource assignment (e.g., for the PUSCH). Additionally or alternatively, the DCI included in the DCI format 0_1 may be a modulation and coding scheme (e.g., for the PUSCH). Additionally or alternatively, the DCI included in the DCI format 0_1 may be a priority indicator. Additionally or alternatively, the DCI included in the DCI format 0_1 may be DCI used for indicating an antenna port(s) (i.e., an uplink antenna port(s)) (e.g., an index (indices) of the antenna port(s), a number(s) of the antenna port(s)). Additionally or alternatively, the DCI included in the DCI format 0_1 may be DCI used for indicating DMRS(s) sequence initialization. Namely, the DCI included in the DCI format 0_1 may be used for indicating a sequence initialization for the DMRS(s) for the PUSCH, as described in detail below.

Additionally or alternatively, the DCI (e.g., the number of bits (e.g., the number of bit field(s))) included in the DCI format 0_1 may be configurable. For example, for each DCI (i.e., the DCI included in the DCI format 0_1), the gNB 160 may configure information used for indicating (e.g., determining) the number of bits. For example, the gNB 160 may transmit, by using the RRC message (e.g., the dedicated RRC message), the information (e.g., one or more parameters) used for indicating (e.g., determining) the number of bits for each DCI (i.e., the DCI included in the DCI format 0_1). Namely, each of the information (e.g., each of the one or more parameters) may be used for indicating (e.g., determining) the number of bits for each DCI, respectively.

For example, the number of bits for the BWP indicator included in the DCI format 0_1 may be 0, 1, or 2 bits. Additionally or alternatively, the number of bits for the frequency domain resource assignment included in the DCI format 0_1 may be determined based on the number of the active UL BWP(s) which is configured by using information (e.g., transmitted by using the RRC message). Additionally or alternatively, the number of bits for the time domain resource assignment included in the DCI format 0_1 may be 0, 1, 2, 3, or, 4 bits. Additionally or alternatively, the number of bits for the modulation and coding scheme included in the DCI format 0_1 may be 5 bits. Additionally or alternatively, the number of bits for the priority indicator included in the DCI format 0_1 may be 1 bit (i.e., always 1 bit). Additionally or alternatively, the number of bits for the priority indicator included in the DCI format 0_1 may be 0 or 1 bit (i.e., the gNB 160 may transmit, e.g., by using the RRC message, information used for configuring (e.g., determining) the number of bits for the priority indicator). Additionally or alternatively, the number of bits for the DCI used for indicating the antenna port(s) (e.g., the index (indices) of the antenna port(s), the number(s) of the antenna port(s)) included in the DCI format 0_1 may be 2, 3, 4 or 5 bits. Namely, the number of bits for the DCI used for indicating the antenna port(s) included in the DCI format 0_1 may not be "0" bit (i.e., may not be configured as "0" bit). Additionally or alternatively, the number of bits for the DCI used for indicating the DMRS sequence initialization included in the DCI format 1_1 may be 1 bit (i.e., always 1 bit). Namely, the number of bits for the DMRS sequence initialization included in the DCI format 1_1 may not be "0" bit (i.e., may not be configured as "0" bit).

Additionally or alternatively, a DCI format 0_Y that is used for scheduling of the PUSCH in the cell may be defined as the DCI format for the uplink. Additionally or alternatively, the C-RNTI, the CS-RNTI, the MCS-C-RNTI, and/or the first RNTI may be used to transmit the DCI format 0_Y. Additionally or alternatively, the DCI format 0_Y may be monitored (e.g., transmitted, mapped) in the CSS and/or the USS.

For example, the DCI included in the DCI format 0_Y may be a BWP indicator (e.g., for the PUSCH). Additionally or alternatively, the DCI included in the DCI format 0_Y may be a frequency domain resource assignment (e.g., for the PUSCH). Additionally or alternatively, the DCI included in the DCI format 0_Y may be a time domain resource assignment (e.g., for the PUSCH). Additionally or alternatively, the DCI included in the DCI format 0_Y may be a modulation and coding scheme (e.g., for the PUSCH). Additionally or alternatively, the DCI included in the DCI format 0_Y may be a priority indicator. Additionally or alternatively, the DCI included in the DCI format 0_Y may be DCI used for indicating an antenna port(s) (i.e., an uplink antenna port(s)) (e.g., an index (indices) of the antenna port(s), a number(s) of the antenna port(s)). Additionally or alternatively, the DCI included in the DCI format 0_Y may be DCI used for indicating DMRS(s) sequence initialization. Namely, the DCI included in the DCI format 0_Y may be used for indicating a sequence initialization for the DMRS(s) for the PUSCH, as described in detail below.

Additionally or alternatively, the DCI (e.g., the number of bits (e.g., the number of bit field(s))) included in the DCI format 0_Y may be configurable. For example, for each DCI (i.e., the DCI included in the DCI format 0_Y), the gNB 160 may configure information used for indicating (e.g., determining) the number of bits. For example, the gNB 160 may transmit, by using the RRC message (e.g., the dedicated RRC message), the information (e.g., one or more parameters) used for indicating (e.g., determining) the number of bits for each DCI (i.e., the DCI included in the DCI format 0_Y). Namely, each of the information (e.g., each of the one or more parameters) may be used for indicating (e.g., determining) the number of bits for each DCI, respectively.

For example, the number of bits for the BWP indicator included in the DCI format 0_Y may be 0, 1, or 2 bits. Additionally or alternatively, the number of bits for the frequency domain resource assignment included in the DCI format 0_Y may be determined based on the number of the active UL BWP(s) which is configured by using information (e.g., transmitted by using the RRC message). Additionally or alternatively, the number of bits for the time domain resource assignment included in the DCI format 0_Y may be 0, 1, 2, 3, or, 4 bits. Additionally or alternatively, the number of bits for the modulation and coding scheme included in the DCI format 0_Y may be 5 bits. Additionally or alternatively, the number of bits for the priority indicator included in the DCI format 0_Y may be 1 bit (i.e., always 1 bit). Additionally or alternatively, the number of bits for the priority indicator included in the DCI format 0_Y may be 0 or 1 bit (i.e., the gNB 160 may transmit, e.g., by using the RRC message, information used for configuring (e.g., determining) the number of bits for the priority indicator). Additionally or alternatively, the number of bits for the DCI used for indicating the antenna port(s) (e.g., the index (indices) of the antenna port(s), the number(s) of the antenna port(s)) included in the DCI format 0_Y may be 0, 2, 3, 4 or 5 bits. Namely, the number of bits for the DCI used for indicating the antenna port(s) included in the DCI format 0_Y may be "0" bit (i.e., may be configured as "0" bit). Additionally or alternatively, the number of bits for the DCI used for indicating the DMRS sequence initialization included in the DCI format 0_Y may be 0, or 1 bit. Namely, the number of bits for the DMRS sequence initialization included in the DCI format 0_Y may be "0" bit (i.e., may be configured as "0" bit).

For example, the gNB 160 may transmit, e.g., by using the RRC message, information used for configuring (e.g., determining) 2, 3, 4 or 5 bits for the DCI used for indicating the antenna port(s) included in the DCI format 0_1 and/or the DCI format 0_Y. Namely, for the DCI used for indicating the antenna port(s) included in the DCI format 0_1 and the DCI format 0_Y, the gNB 160 may commonly configure the number of bits (e.g., 2, 3, 4 or 5 bits) (e.g., by using the information (e.g., a single information)). For example, the number of bits (e.g., 2, 3, 4 or 5 bits) may be defined (e.g., configured, determined) by using Tables 5, 6, 7, and/or 8.

TABLE 5

Antenna port(s), transform precoder is enabled, dmrs-Type = 1, maxLength = 1

| Value | Number of DMRS CDM group(s) without data | DMRS port(s) |
|---|---|---|
| 0 | 2 | 0 |
| 1 | 2 | 1 |
| 2 | 2 | 2 |
| 3 | 2 | 3 |

TABLE 6

Antenna port(s), transform precoder is disabled, dmrs-Type = 1, maxLength = 1 rank = 1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

TABLE 7

Antenna port(s), transform precoder is enabled, dmrs-Type = 1, maxLength = 2

| Value | Number of DMRS CDM group(s) without data | DMRS port(s) | Number of front-load symbols |
|---|---|---|---|
| 0 | 2 | 0 | 1 |
| 1 | 2 | 1 | 1 |
| 2 | 2 | 2 | 1 |
| 3 | 2 | 3 | 1 |
| 4 | 2 | 0 | 2 |
| 5 | 2 | 1 | 2 |
| 6 | 2 | 2 | 2 |
| 7 | 2 | 3 | 2 |
| 8 | 2 | 4 | 2 |

TABLE 7-continued

Antenna port(s), transform precoder is enabled, dmrs-Type = 1, maxLength = 2

| Value | Number of DMRS CDM group(s) without data | DMRS port(s) | Number of front-load symbols |
|---|---|---|---|
| 9 | 2 | 5 | 2 |
| 10 | 2 | 6 | 2 |
| 11 | 2 | 7 | 2 |
| 12-15 | Reserved | Reserved | Reserved |

TABLE 8

Antenna port(s), transform precoder is disabled, dmrs-Type = 1, maxLength = 2, rank = 1

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28-31 | Reserved | Reserved | Reserved |

Here, the transform precoder may be configured (e.g., enabled and/or disabled) by the gNB 160 to the UE 102 by using the RRC message. Namely, for example, the gNB 160 may transmit, by using the RRC message, information (e.g., fifth information) used for enabling the transform precoder. For example, the fifth information may be information related to the DMRS for the PUSCH (e.g., DMRS related parameters for DFT-S-OFDM (e.g., transform precoding)). For example, the fifth information may include information used for indicating an identity (e.g., nPUSCH-Identity) for DFT-S-OFDM DMRS for the PUSCH. Additionally or alternatively, the fifth information may include information used for enabling and/or disabling a sequence group hopping (e.g., sequenceGroupHopping). For example, for the transmission (e.g., with the transform precoder) of the DMRS for the PUSCH, the gNB 160 may enable and/or disable a group hopping by using a cell-specific parameter. Additionally or alternatively, for the transmission (e.g., with the transform precoder) of the DMRS for the PUSCH (e.g., except for the Msg. 3 transmission in the random access procedure), the gNB 160 may disable the group hopping by using the information (e.g., sequenceGroupHopping). Additionally or alternatively, in a case that the information (e.g., sequenceGroupHopping) is not configured (e.g., in a case that a field of the information (e.g., sequenceGroupHopping) is absent (e.g., in a case that the information (e.g., sequenceGroupHopping) is not present)), a physical cell identity may be used (e.g., the UE 102 may use a physical cell identity). Additionally or alternatively, the fifth information may include information used for enabling and/or disabling a sequence hopping (e.g., sequenceHopping). For example, for the transmission (e.g., with the transform precoder) of the DMRS for the PUSCH, the gNB 160 may enable and/or disable a sequence hopping by using a cell-specific parameter. Additionally or alternatively, for the transmission (e.g., with the transform precoder) of the DMRS for the PUSCH (e.g., except for the Msg. 3 transmission in the random access procedure), the gNB 160 may disable the sequence hopping by using the information (e.g., sequenceHopping). Additionally or alternatively, in a case that the information (e.g., sequenceHopping) is not configured (e.g., in a case that a field of the information (e.g., sequenceHopping) is absent (e.g., in a case that the information (e.g., sequenceHopping) is not present)), a physical cell identity may be used (e.g., the UE 102 may use a physical cell identity).

Additionally or alternatively, the gNB 160 may transmit, by using the RRC message, information (e.g., sixth information) used for disabling the transform precoder. For example, the sixth information may be information related to the DMRS for the PUSCH (e.g., DMRS related parameters for OFDM (e.g., Cyclic Prefix OFDM (CP-OFDM))). For example, the sixth information may include information used for indicating an scrambling identity (e.g., scramblingID0) for CP-OFDM DMRS for the PUSCH. Here, the scrambling identity may be the DMRS scrambling initialization (e.g., for the CP-OFDM). Additionally or alternatively, in a case that the information used for indicating an scrambling identity (e.g., scramblingID0) is not configured (e.g., in a case that a field of the information used for indicating the scrambling identity (e.g., scramblingID0) is absent (e.g., in a case that the information used for indicating the scrambling identity (e.g., scramblingID0) is not present)), a physical cell identity may be used (e.g., the UE 102 may use a physical cell identity). Additionally or alternatively, the sixth information may include information used for indicating an scrambling identity (e.g., scramblingID1) for CP-OFDM DMRS for the PUSCH. Additionally or alternatively, in a case that the information used for indicating an scrambling identity (e.g., scramblingID1) is not configured (e.g., in a case that a field of the information used for indicating the scrambling identity (e.g., scramblingID1) is absent (e.g., in a case that the information used for indicating the scrambling identity (e.g., scramblingID1) is not present)), a physical cell identity may be used (e.g., the UE 102 may use a physical cell identity). Here, for the DMRS for the PUSCH (e.g., for the generation of the sequence of the DMRS for the PUSCH), the scrambling identity (e.g., scramblingID1, and/or scramblingID1) may be included in DMRS-UplinkConfig IE (i.e., Information Element).

Here, for Table 5, 6, 7, and/or 8, dmrs-Type may be information (e.g., seventh information) transmitted from the gNB 160 to the UE 102 by using the RRC message. Namely, for example, the gNB 160 may transmit, by using the RRC message, the seventh information. For example, the seventh information may be used for selection of a DMRS type to be used for UL (e.g., the PUSCH, the PUSCH transmission). For example, the UE 102 may assume that the DMRS for the PUSCH being mapped to physical resources (e.g., resource element(s)) based on the seventh information. Namely, a position(s) of the physical resource to which the DMRS for the PUSCH is mapped (e.g., a position of the DMRS for the PUSCH) may be determined based on the seventh information. Here, in a case that the seventh information is not configured (e.g., in a case that a field of the seventh information is absent (e.g., in a case that the seventh information is not present)), dmrs-Type=1 may be used (e.g., the UE may use dmrs-Type=1).

Additionally or alternatively, for Table 5, 6, 7, and/or 8, maxLength may be information (e.g., eighth information) transmitted from the gNB 160 to the UE 102 by using the RRC message. Namely, for example, the gNB 160 may transmit, by using the RRC message, the eighth information. For example, the eighth information may be used for configuring (e.g., indicating) the maximum number of OFDM symbols for the DMRS for the PUSCH (e.g., UL front loaded DMRS (e.g., for the PUSCH)). For example, the UE 102 may determine a position(s) of a time domain of the DMRS for the PUSCH (e.g., duration for the DMRS for the PUSCH) based on the eighth information. Namely, a position(s) of the DMRS for the PUSCH may be determined based on the eighth information. Here, in a case that the eighth information is not configured (e.g., in a case that a field of the eighth information is absent (e.g., in a case that the eighth information is not present)), maxLength=1 may be used (e.g., the UE may use maxLength=1).

As described, the number of bits for the DCI used for indicating the antenna ports(s) included in the DCI format 0_1 and/or the DCI format 0_Y may be defined (e.g., configured) based on Tables 5, 6, 7, and/or 8. Namely, the number of bits for the DCI used for indicating the antenna port(s) included in the DCI format 0_1 and/or the DCI format 0_Y may be determined based on the fifth information, the sixth information, the seventh information, and/or the eighth information. Namely, the number of bits for the DCI used for indicating the antenna port(s) included in the DCI format 0_1 and/or the DCI format 0_Y may be determined based on the seventh information, the eighth information, and/or whether the transform is enabled or disabled. For example, in a case that the transform precoder is enabled, the seventh information (i.e., dmrs-Type)=1 is configured, and the eighth information (i.e., maxLength)=1 is configured, the number of bits for the DCI used for indicating the antenna port(s) included in the DCI format 0_1 and/or the DCI format 0_Y may be 2 bits. Additionally or alternatively, in a case that the transform precoder is disabled, the seventh information (i.e., dmrs-Type)=1 is configured, and the eighth information (i.e., maxLength)=1 is configured, the number of bits for the DCI used for indicating the antenna port(s) included in the DCI format 0_1 and/or the DCI format 0_Y may be 3 bits. Additionally or alternatively, in a case that the transform precoder is enabled, the seventh information (i.e., dmrs-Type)=1 is configured, and the eighth information (i.e., maxLength)=2 is configured, the number of bits for the DCI used for indicating the antenna port(s) included in the DCI format 0_1 and/or the DCI format 0_Y may be 4 bits. Additionally or alternatively, in a case that the transform precoder is disabled, the seventh information (i.e., dmrs-Type)=2 is configured, and the eighth information (i.e., maxLength)=2 is configured, the number of bits for the DCI used for indicating the antenna port(s) included in the DCI format 0_1 and/or the DCI format 0_Y may be 5 bits.

Additionally or alternatively, as described above, for the DCI format 0_Y, the gNB 160 may transmit, by using the RRC message, information (e.g., ninth information) used for configuring 0 bit for the number of bits for the DCI used for indicating the antenna port(s). For example, as the ninth information, the gNB 160 may transmit information used for configuring (e.g., indicating) 0 bit for the number of bits for the DCI used for indicating the antenna port(s) included in the DCI format 0_Y. Namely, in a case that the ninth information (e.g., the information used for configuring 0 bit for the number of bits for the DCI used for indicating the antenna port(s)) is not configured, 2, 3, 4, or 5 bits (e.g., determined based on the fifth information, the sixth information, the seventh information, and the eighth information, as described above) may be used (e.g., configured, indicated) for the number of bits for the DCI used for indicating the antenna port(s) included in the DCI format 0_Y. Additionally or alternatively, as the ninth information, the gNB 160 may transmit information used for configuring whether the number of bits for the DCI used for indicating the antenna port(s) included in the DCI format 0_Y is 0 bit or more than 0 bit (e.g., 2, 3, 4, or 5 bits). For example, as the ninth information, the gNB 160 may transmit the information used for configuring true (i.e., the number of bits for the DCI used for indicating the antenna port(s) included in the DCI format 0_Y is 0 bit) or false (i.e., the number of bits for the DCI used for indicating the antenna port(s) included in the DCI format 0_Y is more than 0 bit (e.g., 2, 3, 4 or 5 bits)). And, in a case that the false (i.e., the number of bits for the DCI used for indicating the antenna port(s) included in the DCI format 0_Y is more than 0 bit (e.g., 4, 5, or 6 bits)) is configured, the UE 102 may determine the number of bits for the DCI used for indicating the antenna port(s) included in the DCI format 0_Y based on the fifth information, the sixth information, the seventh information, and the eighth information, as described above. Additionally or alternatively, for the DCI format 0_Y, in a case that the fifth information is not configured, the sixth information is not configured, the seventh information is not configured, and/or the eighth information is not configured, the number of bits for the DCI used for indicating the antenna port(s) included in the DCI format 0_Y may be considered (e.g., assumed) as 0 bit (e.g., 0 bis may be used, the UE 102 may use 0 bit). Namely, for the DCI format 0_1, in a case that the fifth information is not configured, the physical cell identity is used (e.g., the UE may use the physical cell identity). Additionally or alternatively, for the DCI format 0_1, in a case that the sixth information is not configured, the physical cell identity is used (e.g., the UE may use the physical cell identity). Additionally or alternatively, for the DCI format 0_1, in a case that the seventh information is not configured, dmrs-Type=1 may be used (e.g., the UE may use dmrs-Type=1). Additionally or alternatively, for the DCI format 0_1, in a case that the eighth information is not configured, maxLength=1 may be used (e.g., the UE may use max-Length=1).

Additionally or alternatively, as described above, for the DCI format 0_Y, the gNB 160 may transmit, by using the RRC message, information (e.g., tenth information) used for configuring 0 bit for the number of bits for the DCI used for indicating the DMRS sequence initialization. For example, as the tenth information, the gNB 160 may transmit information used for configuring (e.g., indicating) 0 bit for the number of bits for the DCI used for indicating the DMRS sequence initialization included in the DCI format 0_Y. Namely, in a case that the tenth information (e.g., the information used for configuring 0 bit for the number of bits for the DCI used for indicating the DMRS sequence initialization) is not configured, 1 bit may be used (e.g., configured, indicated) for the number of bits for the DCI used for indicating the DMRS sequence initialization included in the DCI format 0_Y. Additionally or alternatively, as the tenth information, the gNB 160 may transmit information used for configuring whether the number of bits for the DCI used for indicating the DMRS sequence initialization included in the DCI format 0_Y is 0 bit or 1 bit. For example, as the tenth information, the gNB 160 may transmit the information used for configuring true (i.e., the number of bits for the DCI used for indicating the DMRS sequence initialization included in the DCI format 0_Y is 0 bit) or false (i.e., the number of bits for the DCI used for indicating the DMRS sequence initialization included in the DCI format 0_Y is 1 bit).

Additionally or alternatively, the number of bits for the DCI used for indicating the DMRS sequence initialization included in the DCI format 0_Y may be determined based on the tenth information, the fifth information, and/or the sixth information. Namely, the number of bits for the DCI used for indicating the DMRS sequence initialization included in the DCI format 0_Y may be determined based on the tenth information and/or whether the transform precoder is enabled or disabled. For example, in a case that the tenth information is configured as false (e.g., or true) and the transform precoder is enabled, the number of bits for the DCI used for indicating the DMRS sequence initialization included in the DCI format 0_Y may be 0 bit. Additionally or alternatively, in a case that the tenth information is configured as false (e.g., or true) and the transform precoder is disabled, the number of bits for the DCI used for indicating the DMRS sequence initialization included in the DCI format 0_Y may be 1 bit.

Here, for the DCI format 0_1, in a case that the transform precoder is enabled, the number of bits for the DCI used for indicating the DMRS sequence initialization may be 0 bit. Additionally or alternatively, for the DCI format 0_1, in a case that the transform precoder is disabled, the number of bits for the DCI used for indicating the DMRS sequence initialization may be 1 bit.

Additionally or alternatively, as described above, a RNTI(s) (e.g., a Radio Network Temporary Identifier(s)) assigned to the UE 102 may be used for transmission of DCI (e.g., the DCI format(s), DL control channel(s) (e.g., the PDCCH(s)). Namely, the gNB 160 may transmit, (e.g., by using the RRC message), information used for configuring (e.g., assigning) the RNTI(s) to the UE 102.

For example, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. For example, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). For example, the UE 102 may detect the DCI format(s) with the RNTI(s).

Here, the RNTI(s) may include the C-RNTI(s) (Cell-RNTI(s)), the CS-RNTI(s) (Configured Scheduling C-RNTI(s)), the SI-RNTI(s) (System Information RNTI(s)), the RA-RNTI(s) (Random Access-RNTI(s)), the Temporary C-RNTI(s), the MCS-C-RNTI (Modulation and Coding Scheme-C-RNTI), and/or the first RNTI.

For example, the C-RNTI(s) may be an unique identification used for identifying an RRC connection and/or scheduling. Additionally or alternatively, the CS-RNTI(s) may be an unique identification used for scheduling of transmission based on a configured grant. Additionally or alternatively, the SI-RNTI may be used for identifying system information (SI) (e.g., an SI message) mapped on the BCCH and dynamically carried on DL-SCH. Additionally or alternatively, the SI-RNTI may be used for broadcasting of SI. Additionally or alternatively, the RA-RNTI may be an identification used for the random access procedure (e.g., Msg.2 transmission). Additionally or alternatively, the Temporary C-RNTI may be used for the random access procedure (e.g., scheduling of Msg.3 (re)transmission (e.g., Msg.3 PUSCH (re)transmission)). Additionally or alternatively, the MCS-C-RNTI may be an unique identification used for indicating a MCS table (e.g., an alternative MCS table) for the PDSCH and/or the PUSCH. The first RNTI may be different from the C-RNTI, the CS-RNTI, the SI-RNTI, the RA-RNTI, the Temporary C-RNTI, and/or the MCS-C-RNTI.

Here, in the random access procedure (e.g., a contention based random access procedure), the Msg.3 PUSCH transmission (e.g., an initial transmission) may be scheduled by using a random access response grant. For example, in the random access procedure, the random access response grant may be included in the PDSCH (e.g., the Msg.2 transmission). Also, in the random access procedure, the random access response grant may be used for scheduling of the PUSCH for the Msg. 3 transmission. Also, as described above, the PDCCH (i.e., the DCI format 0_0) with the CRC scrambled by the Temporary C-RNTI may be used for scheduling of the PUSCH for the Msg. 3 transmission (e.g., Msg. 3 retransmission).

Additionally or alternatively, a physical downlink shared channel (PDSCH) and a physical uplink shared channel (PUSCH) may be defined. For example, in a case that the PDSCH (e.g., the PDSCH resource) is scheduled by using the DCI format(s) for the downlink, the UE 102 may receive the downlink data, on the scheduled PDSCH (e.g., the PDSCH resource). Additionally or alternatively, in a case that the PUSCH (e.g., the PUSCH resource) is scheduled by using the DCI format(s) for the uplink, the UE 102 transmits the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., the UL-SCH(s), the uplink transport block(s), the MAC PDU).

Furthermore, the PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). Here, the RRC message and/or the MAC CE are also referred to as a higher layer signal.

In some approaches, a physical broadcast channel (PBCH) may be defined. For example, the PBCH may be used for broadcasting the MIB (master information block). Here, system information may be divided into the MIB and a number of SIB(s) (system information block(s)). For example, the MIB may be used for carrying include minimum system information. Additionally or alternatively, the SIB(s) may be used for carrying system information messages.

In some approaches, in downlink, a SS (Synchronization Signal) may be defined. The SS may be used for acquiring time and/or frequency synchronization with a cell. Additionally or alternatively, the SS may be used for detecting a physical layer cell ID of the cell.

In the radio communication for uplink, UL RS(s) may be used as uplink physical signal(s). Additionally or alternatively, in the radio communication for downlink, DL RS(s) may be used as downlink physical signal(s). The uplink physical signal(s) and/or the downlink physical signal(s) may not be used to transmit information that is provided from the higher layer, but is used by a physical layer.

Here, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

Also, in a carrier aggregation (CA), the gNB 160 and the UE 102 may communicate with each other using one or more serving cells. Here the one or more serving cells may include one primary cell and one or more secondary cells. For example, the gNB 160 may transmit, by using the RRC message, information used for configuring one or more secondary cells to form together with the primary cell a set of serving cells. Namely, the set of serving cells may include one primary cell and one or more secondary cells. Here, the primary cell may be always activated. Also, the gNB 160 may activate one or more secondary cell within the configured secondary cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

Additionally or alternatively, a dual connectivity operation may be supported. For example, in the dual connectivity operation, a special cell may be defined. For example, the special cell may include the primary cell (e.g., the primary cell of a master cell group (e.g., a MSG)) and/or a primary secondary cell (e.g., the primary secondary cell of a secondary cell group (e.g., a SCG)). Here, the primary secondary cell may be referred to as a primary secondary cell group cell (e.g., a Primary SCG cell). Namely, the term "the special cell" refers to the primary cell (e.g., the primary cell of the MCG) and/or the primary secondary cell (e.g., the primary secondary cell of the SCG).

For example, the primary cell may be a serving cell (e.g., the MCG cell), operating a primary frequency, in which the UE 102 may perform an initial connection establishment procedure and/or initiate a connection re-establishment procedure. Also, the primary secondary cell may be a serving cell (e.g., the SCG cell) in which the UE 102 may perform the random access procedure (e.g., in a case that the UE 102 perform a reconfiguration (e.g., a reconfiguration with a synchronization procedure)).

Additionally or alternatively, the special cell may be always activated (e.g., the special cell may not be deactivated). Namely, the secondary cell(s) may be activated and deactivated. Also, a transmission(s) of the PUCCH may be performed (e.g., supported) only on the special cell. Namely, the transmission(s) of the PUCCH may be always performed on the special cell. For example, resources (e.g., a resource set(s)) for the transmission of the PUCCH may be configured and/or indicated (e.g., for the UE 102 by the gNB 160 (e.g., by using the RRC message and/or the DCI format(s))) only on the special cell. Additionally or alternately, resources (e.g., a resource set(s)) for the transmission of the PUCCH may be configured and/or indicated (e.g., for the UE 102 by the gNB 160 (e.g., by using the RRC message and/or the DCI format(s))) only on each UL BWP of the special cell (e.g., only on each UL BWP in a set of UL BWPs of the special cell). Additionally or alternatively, the contention based random access procedure may be performed (e.g., supported) only on the special cell.

Namely, the serving cell(s) may include the primary cell(s) (e.g., the primary cell of the MCG), the primary secondary cell(s) (e.g., the primary secondary cell of the SCG), and/or the secondary cell(s) (e.g., the secondary cell(s) of the MCG and/or the SCG).

For example, the gNB 160 may transmit, by using the RRC message, information used for configuring an index of the serving cell(s) (e.g., an index of the primary secondary cell(s) and/or an index of the secondary cell(s)). Namely, the index of the serving cell(s) may be used for identifying the serving cell(s). The UE 102 may identify the serving cell(s) based on the index of the serving cell(s). Here, an index of the primary cell may be defined as "0". Namely, the index of the primary cell may be always "0". For example, the gNB 160 may transmit, by using the RRC message, information used for configuring an index of the secondary cell(s). And, the UE 102 may identify the index of the serving cell(s) (e.g., the secondary cell(s)), based on the information.

Additionally or alternatively, the gNB 160 may transmit, by using the RRC message, information used for configuring a cell group(s) (e.g., a cell group(s) associated with the dual connectivity operation (e.g., the MCG(s) and/or the SCG(s))). As described above, the MCG may include the primary cell and/or the secondary cell(s). Also, the SCG may include the primary secondary cell and/or the secondary cell(s). For example, in the dual connectivity operation, in a case that the UE 102 is configured the cell group(s) (e.g., the MCG(s) and/or the SCG(s)), the UE 102 is configured with two MAC entities (e.g., one MAC entity for the MCG and one MAC entity for SCG). For example, in a case that the UE 102 is not configured the cell group(s) (e.g., the MCG(s) and/or the SCG(s)), the UE 102 is configured with one MAC entities (e.g., one MAC entity for the MCG). Namely, for Dual Connectivity operation, the term "the special cell" may refer to the primary cell of the MCG or the primary secondary cell of the SCG depending on if the MAC entity is associated to the MCG or the SCG, respectively.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 201. As shown in FIG. 2, multiple numerologies 201 (e.g., multiple subcarrier spacing) may be supported. For example, µ (e.g., a subcarrier space configuration) and a cyclic prefix (e.g., the µ and the cyclic prefix for a carrier bandwidth part) may be configured by higher layer parameters (e.g., a RRC message) for the downlink and/or the uplink. Here, 15 kHz may be a reference numerology 201. For example, an RE of the reference numerology 201 may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Additionally or alternatively, a number of OFDM symbol(s) 203 per slot ($N_{symb}^{slot}$) may be determined based on the (e.g., the subcarrier space configuration). Here, for example, a slot configuration 0 (e.g., the number of OFDM symbols 203 per slot may be 14) and/or a slot configuration (e.g., the number of OFDM symbols 203 per slot may be 7) may be defined.

Figure 3:
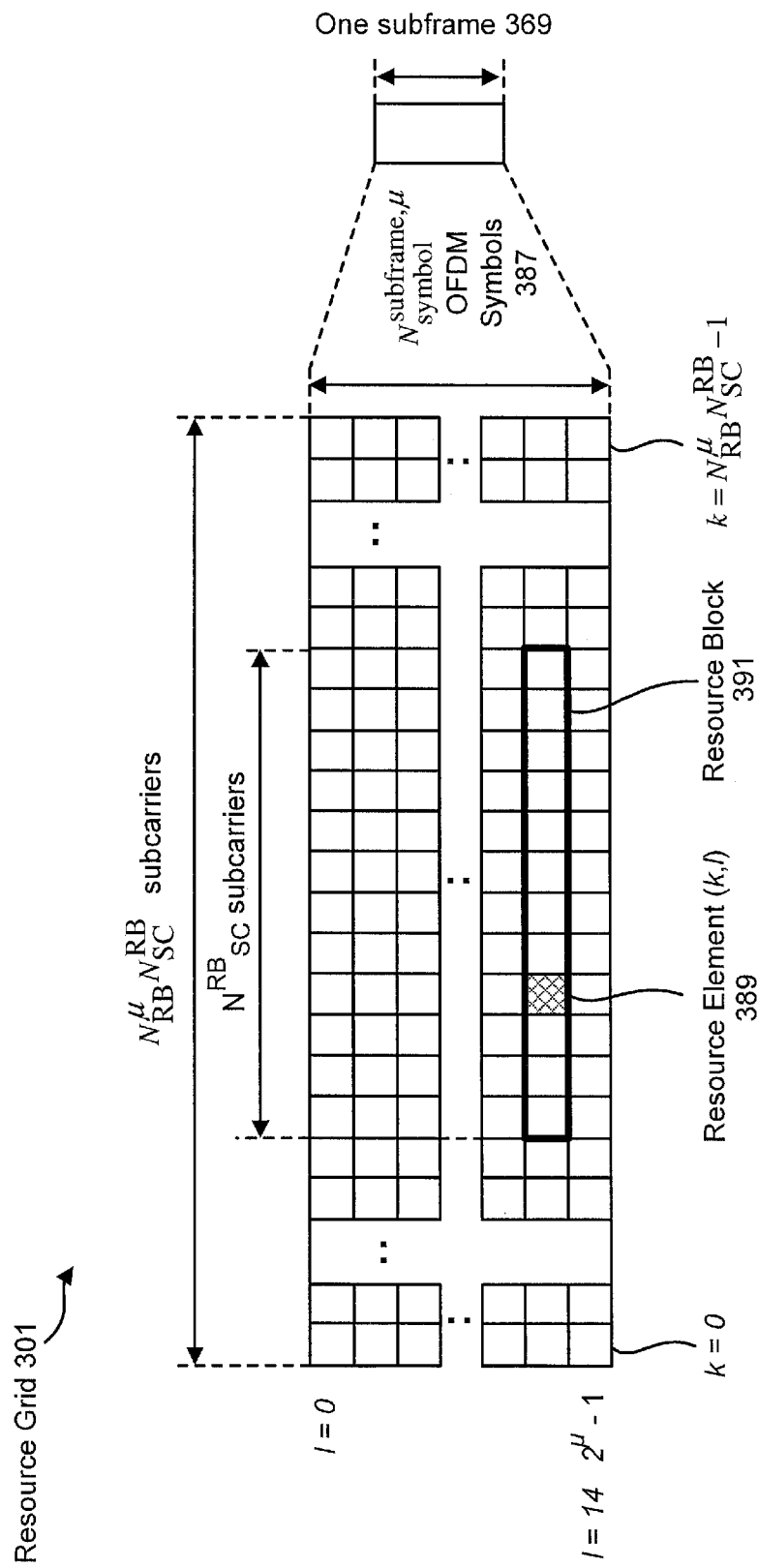
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $N_{symbol}^{subframe,\mu}$ symbols 387. Additionally or alternatively, a resource block 391 may include a number of resource elements (RE) 389. Here, in the downlink, the OFDM access scheme with cyclic prefix (CP) may be employed, which may be also referred to as CP-OFDM. A downlink radio frame may include multiple pairs of downlink resource blocks (RBs) 391 which are also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and 1 are indices in the frequency and time domains respectively.

Each element in the resource grid 301 (e.g., antenna port p) and the subcarrier configuration µ is called a resource element 389 and is uniquely identified by the index pair (k,l) where k=0, ..., $N_{RB}^{\mu} N_{SC}^{RB}-1$ is the index in the frequency domain and l refers to the symbol position in the time domain. The resource element (k,l) 389 on the antenna port p and the subcarrier spacing configuration µ is denoted (k,l)p,µ. The physical resource block 391 is defined as $N_{SC}^{RB}=12$ consecutive subcarriers in the frequency domain. The physical resource blocks 391 are numbered from 0 to $N_{RB}^\mu-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
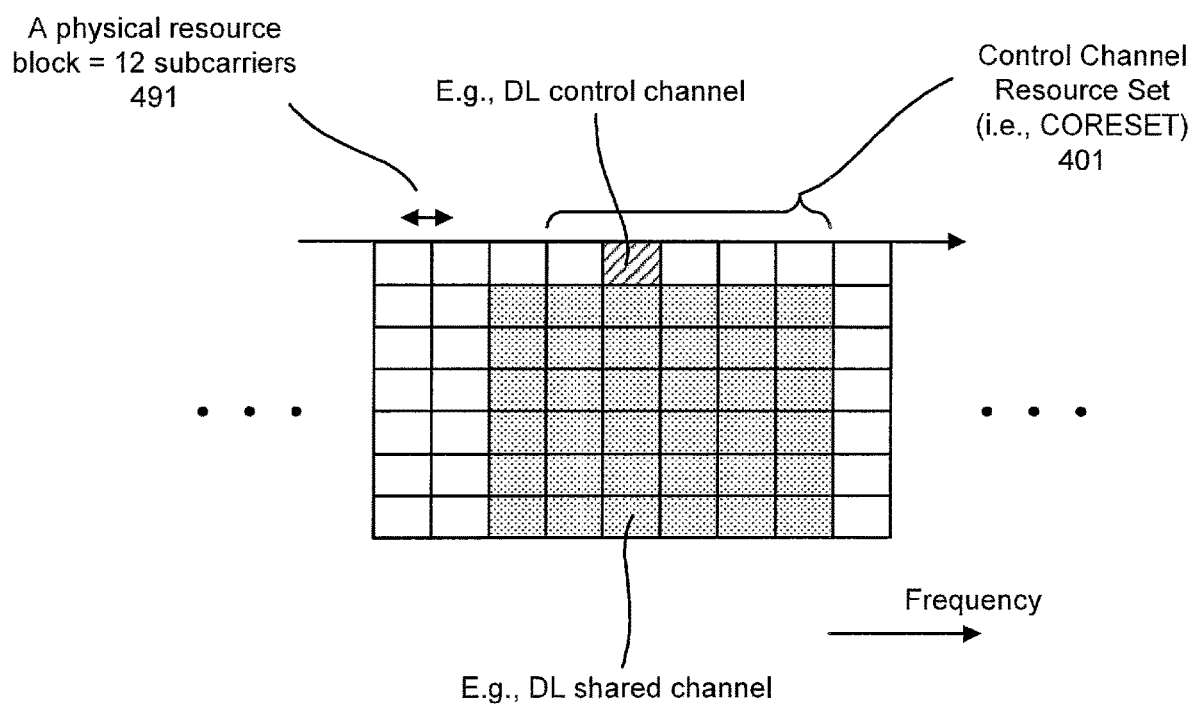
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the CORESET is, in the frequency domain and/or the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DM-RS) for the DL control channel.

The UE 102 may monitor a set of candidates of the PDCCH (e.g., PDCCH candidates) in one or more control resource sets (e.g., CORESETs) on the active DL bandwidth part (BWP) on each activated serving cell according to corresponding search space sets. Here, the term "monitor" may imply that the UE 102 attempts to decode each PDCCH (e.g., the set of candidates of the PDCCH) according to the monitored DCI format(s). Also, the candidates of the PDCCH may be candidates for which the DL control channel(s) may possibly be mapped, assigned, and/or transmitted.

The set of candidates of the PDCCH for the UE 102 to monitor may be defined in terms of a search space set(s) (e.g., also referred to simply as a search space(s)). The UE 102 may monitor the set of candidates of the PDCCH in the search space(s). The search space set(s) may comprise a common search space(s) (CSS(s), UE-common search space(s)) and/or a user equipment-specific search space(s) (USS, UE-specific search space(s)).

Namely, the CSS and/or the USS may be defined (e.g., configured) in a region(s) of DL control channel(s). For example, the CSS may be used for transmission of DCI to a plurality of the UEs 102. For example, a Type0-PDCCH common search space may be defined for the DCI format(s) with CRC scrambled by the SI-RNTI. Additionally or alternatively, a Type1-PDCCH common search space may be defined for the DCI format(s) with CRC scrambled by the RA-RNTI, the Temporary C-RNTI, and/or the C-RNTI. Additionally or alternatively, a Type3-PDCCH common search space may be defined for the DCI format(s) with CRC scrambled by the C-RNTI, and/or the CS-RNTI.

The USS may be used for transmission of DCI to a specific UE 102. For example, the USS may be determined based on a Radio Network Temporary Identifier (RNTI) (e.g., the C-RNTI). For instance, the USS may be defined for the DCI format(s) with CRC scrambled by the C-RNTI, and/or the CS-RNTI.

Here, the gNB 160 may transmit, by using the RRC message, eleventh information used for configuring (e.g., determining) one or more CORESETs. For example, for each of DL BWPs (e.g., each of DL BWPs in the serving cell), the gNB 106 may transmit, by using the RRC message, the eleventh information used for configuring the one or more CORESET. For example, the eleventh information may include information used for configuring an index of the CORESET. Also, the eleventh information may include information used for configuring a number of consecutive symbols for the CORESET. Also, the eleventh information may include information used for configuring a set of resource blocks for the CORESET.

Here, the index "0" of the CORESET (i.e., a value "0" of the CORESET, CORESET #0) may be configured by using the MIB and/or the SIB(s). For example, the index "0" of the CORESET may be used for identifying a common CORESET configured in the MIB and/or the SIB(s). Namely, the index of the CORESET except for the value "0" may be configured as the index of the CORESET. Also, the index of the CORESET with the value "0" may be configured by using information of a CORESET-zero. Also, the index "0" of the CORESET may be configured by using a dedicated RRC message (i.e., a UE-specific RRC message, and/or a serving cell-specific RRC message). Namely, the gNB 160 may transmit, by using the MIB, information used for configuring the CORESET with the index "0" (i.e., a CORESET #0). Additionally or alternatively, the gNB 160 may transmit, by using the SIB(s), the information used for configuring the CORESET #0. Additionally or alternatively, the gNB 160 may transmit, by using the dedicated RRC message, the information used for configuring the CORESET #0.

Here, the CORESET #0 may be configured for an initial BWP(s) (e.g., the initial DL BWP(s)). Here, the gNB 160 may transmit, by using the RRC message (e.g., the MIB, the SIB(s), and/or the dedicated RRC message), information used for the initial BWP(s) (e.g., the initial BWP(s)). Also, an index of the initial BWP(s) (e.g., the initial DL BWP(s)) may be "0". Namely, the index "0" (e.g., the value "0") may be applied (e.g., defined) for the initial BWP(s) (e.g., the initial DL BWP(s)). For example, (e.g., for the primary cell), the initial BWP(s) (i.e., the BWP with the index "0") may be the BWP(s) used for an initial access. Additionally or alternately, (e.g., for the secondary cell(s)), the initial BWP(s) (i.e., the BWP(s) with the index "0") may be the BWP(s) configured for the UE to first operate at the secondary cell(s) activation.

Here, the gNB 160 may transmit, by using the RRC message (e.g., the MIB, the SIB(s), and/or the dedicated RRC message), information used for configuring an index of the DL BWP(s) (e.g., the index other than the index "0"). Also, the gNB 160 may transmit, by using the RRC message (e.g., the MIB, the SIB(s), and/or the dedicated RRC message), information used for configuring an index of the UL BWP(s) (e.g., the index other than the index "0"). Namely, the index of the DL BWP(s) may be used for identifying the DL BWP(s). Also, the index of the UL BWP(s) may be used for identifying the UL BWP(s). The UE 102 may identify the DL BWP(s) based on the index of the DL BWP(s). Also, the UE 102 may identify the UL BWP(s) based on the index of the UL BWP(s).

As described above, the CORESET #0 may be referred to as the common CORESET. Also, the CORESET other than the CORESET #0 may be referred to as a UE-specific CORESET. Namely, the CORESET with the index "X (e.g., X=1, 2, 3, ... )" other than the index "0" may be referred to as the UE-specific CORESET. For example, the gNB 160 may transmit, by using the dedicated RRC message, information used for configuring the UE-specific CORESET (e.g., the index of the UE-specific CORESET).

Additionally or alternatively, for each of the one or more CORESETs, the search space set(s) (e.g., the set(s) of the CSS(s) and/or the USS(s)) may be configured. Namely, the search space set(s) may be associated with the CORESET(s). For example, the UE 102 may monitor the PDCCH (e.g., the PDCCH candidates) in the CSS set(s) associated with the CORESET #0. Also, the UE 102 may monitor the PDCCH (e.g., the PDCCH candidates) in the CSS set(s) not associated with the CORESET #0. Also, the UE may monitor the PDCCH (e.g., the PDCCH candidates) in the USS (e.g., the USS not associated with the USS). Also, for example, the search space set(s) may be configured per DL BWP. Namely, the search space set(s) may be configured for each of the DL BWPs in the serving cell(s).

Additionally or alternatively, the gNB 160 may transmit, by using the RRC message, twelfth information used for configuring the search space set(s). For example, the twelfth information may be configured for each search space set. For example, the twelfth information may include information used for configuring an index of the search space set(s). Additionally or alternatively, the twelfth information may include information used for configuring the index of the CORESET(s) associated with the search space set(s). Additionally or alternatively, the twelfth information may include information used for indicating a PDCCH monitoring periodicity and/or a PDCCH monitoring offset where the UE 102 monitors the PDCCH(s) in the search space set(s). Additionally or alternatively, the twelfth information may include information used for indicating a PDCCH monitoring pattern within a slot. For example, the information used for indicating the PDCCH monitoring pattern may be used for indicating first symbol(s) within a slot for the PDCCH monitoring. For instance, the UE 102 may determine a PDCCH monitoring occasion(s) based on the PDCCH monitoring periodicity, the PDCCH monitoring offset, and/or the PDCCH monitoring pattern within a slot.

Additionally or alternatively, the twelfth information may include information used for indicating a type of the search space set (e.g., information used for indicating that the search space set is either the CSS or the USS). Additionally or alternatively, the twelfth information may include information used for indicating one or more DCI formats which accordingly the UE 102 monitors the PDCCH in the search space set(s). For example, if the search space set is the CSS (e.g., if the search space set is configured as the CSS), the DCI format 0_0 and/or the DCI format 1_0 may be configured to monitor the PDCCH (e.g., the candidate(s) of the PDCCH(s)). Here, the DCI format(s) for monitoring the PDCCH in the CSS may be scrambled by the C-RNTI, the CS-RNTI, the RA-RNTI, the Temporary C-RNTI, the SI-RNTI, and/or the first RNTI.

Additionally or alternatively, if the search space set is the USS (e.g., if the search space set is configured as the USS), the DCI format 0_0, the DCI format 1_0, the DCI format 0_Y, and/or the DCI format 1_X may be configured to monitor the PDCCH (e.g., the candidate(s) of the PDCCH(s)). Additionally or alternatively, if the search space set is the USS, the DCI format 0_1, the DCI format 1_1, the DCI format 0_Y, and/or the DCI format 1_X may be configured to monitor the PDCCH (e.g., the candidate(s) of the PDCCH(s)). For example, if the search space set is the USS, either of a first set of DCI formats (e.g., the DCI format 0_0, the DCI format 1_0, and/or the DCI format 0_Y, and/or the DCI format 1_X) or a second set of DCI formats (e.g., the DCI format 0_1, the DCI format 1_1, the DCI format 0_Y, and/or the DCI format 1_X) may be configured to monitor the PDCCH (e.g., the candidate(s) of the PDCCH(s)). For example, if the search space set is the USS, either of a third set of DCI formats (e.g., the DCI format 0_Y and/or the DCI format 1_X) or a fourth set of DCI formats (e.g., the DCI format 0_1 and/or the DCI format 1_1) may be configured to monitor the PDCCH. Also, if the search space set is the USS, either of a fifth set of DCI formats (e.g., the DCI format 0_Y and/or the DCI format 1_X) or a sixth set of DCI formats (e.g., the DCI format 0_0 and/or the DCI format 1_0) may be configured to monitor the PDCCH. Here, the DCI format(s) for monitoring the PDCCH in the USS may be scrambled by the C-RNTI, the CS-RNTI, and/or the first RNTI. For example, the twelfth information may be configured per search space set. Namely, the twelfth information may be configured for each of search space sets.

Here, the index "0" of the search space set (i.e., a value "0" of the search space set) may be configured by using the MIB and/or the SIB(s). For example, the index "0" of the search space set may be used for identifying a common search space set configured in the MIB and/or the SIB(s). Namely, the index of the search space set except for the value "0" may be configured as the index of the search space. Also, the index of the search space set with the value "0" may be configured by using information of search space-zero. Also, the index "0" of the search space set may be configured by using a dedicated RRC message (i.e., a UE-specific RRC message, and/or a serving cell-specific RRC message). Namely, the gNB 160 may transmit, by using the MIB, information used for configuring the search space set with the index "0" (i.e., the search space set #0). Additionally or alternatively, the gNB 160 may transmit, by using the SIB(s), the information used for configuring the search space set #0. Additionally or alternatively, the gNB 160 may transmit, by using the dedicated RRC message, the information used for configuring the search space set #0. Here, the search space set #0 may be configured for the initial BWP(s) (e.g., the initial DL BWP(s)).

As described above, the search space set #0 may be referred to as the common search space set. Also, the search space set other than the search space set #0 may be referred to as a UE-specific search space set. Namely, the search space set with the index "X (e.g., X=1, 2, 3, . . . )" other than the index "0" may be referred to as the UE-specific search space set. For example, the gNB 160 may transmit, by using the dedicated RRC message, information used for configuring the UE-specific search space set (e.g., the index of the UE-specific search space set).

Here, for example, for the serving cell(s), the gNB 160 may configure, by using the RRC message, a set of four DL BWPs (e.g., at most four DL BWPs, a DL BWP set) (e.g., for receptions by the UE 102). Additionally or alternatively, the gNB 160 may indicate, by using the DCI format(s) for the downlink, an active DL BWP(s). For example, for each DL BWP in the set of DL BWPs, the gNB 160 may configure, by using the RRC message, the subcarrier spacing, the cyclic prefix, a number of contiguous PRBs 491 (e.g., a bandwidth of PRBs), and/or an index (e.g., the index of the DL BWP(s)) in the set of DL BWPs.

Additionally or alternatively, for the serving cell(s), the gNB 160 may configure, by using the RRC message, a set of four UL BWP(s) (e.g., at most four UL BWPs, a UL BWP set) (e.g., for transmissions by the UE 102). Additionally or alternatively, the gNB 160 may indicate, by using the DCI format(s) for the uplink, an active UL BWP(s). Additionally or alternatively, for each UL BWP in the set of UL BWPs, the gNB 160 may configure, by using the RRC message, the subcarrier spacing, the cyclic prefix, a number of contiguous PRBs 491 (e.g., a bandwidth of PRBs), an index (e.g., the index of the UL BWP(s)) in the set of UL BWPs.

Additionally or alternatively, the UE 102 may perform, based on the configuration(s) for the DL BWP(s), reception(s) on the PDCCH in the DL BWP(s) and/or reception(s) on the PDSCH in the DL BWP(s). Additionally or alternatively, the UE 102 may perform, based on the configuration(s) for the UL BWP(s).

Figure 5:
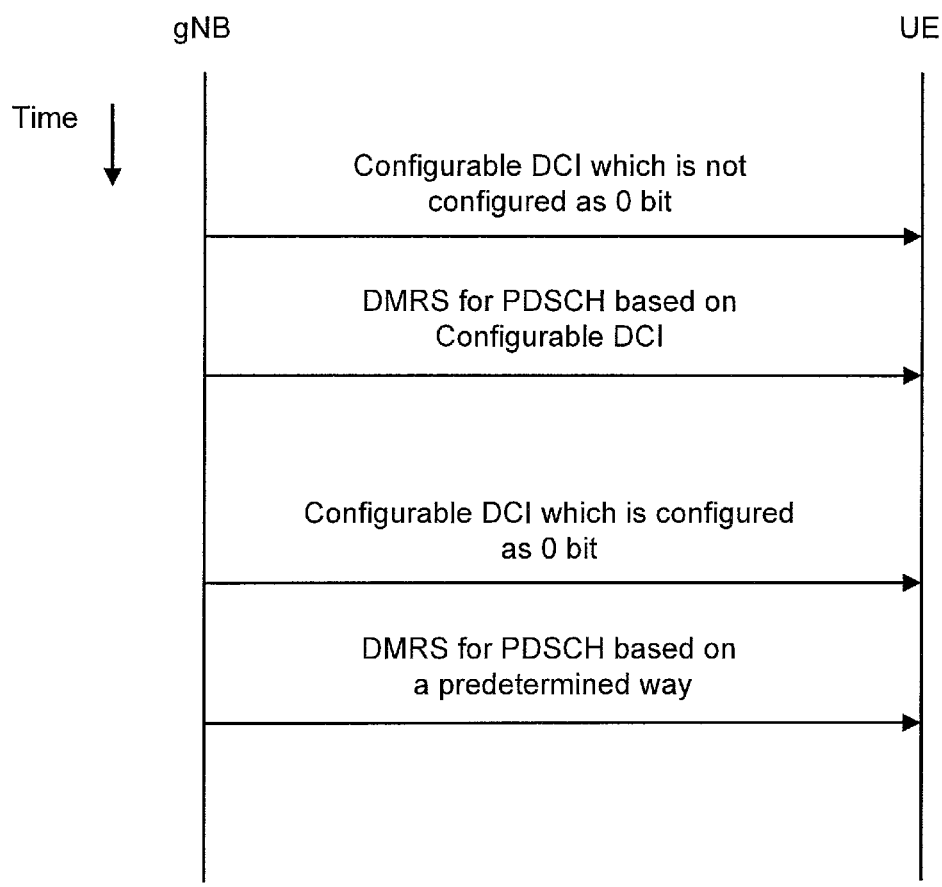
FIG. 5 illustrates an example of downlink transmissions.

FIG. 5 illustrates an example of downlink transmissions. As shown by FIG. 5, the UE 102 may receive the DMRS for the PDSCH using the antenna port(s) (i.e., the downlink antenna port(s)). Here, as described above, the antenna port(s) for the DMRS for the PDSCH may be indicated by using the DCI used for indicating the antenna port(s) included in the DCI format 1_1 and/or the DCI format 1_X. Also, as described above, the number of bits for the DCI used for indicating the antenna port(s) included in the DCI format 1_1 and/or the DCI format 1_X may be configurable.

As described above, for example, in a case that the number of bits for the DCI used for indicating the antenna port(s) included in the DCI format 1_1 and/or the DCI format 1_X is 4 bits (e.g., based on the first information and/or the second information), Table 1 may be used for indicating (e.g., determining) the antenna port(s) (i.e., DMRS port(s) in Table 1) (e.g., the index of the antenna port(s), the number of antenna port(s)). For example, in a case that 4 bits (e.g., 4 bits field of) DCI used for indicating the antenna port(s) is set to a value of "5", the UE 102 may receive the DMRS for the PDSCH using the antenna port(s) with the index "1" (i.e., the DMRS port(s)=2).

Additionally or alternately, for example, in a case that the number of bits for the DCI used for indicating the antenna port(s) included in the DCI format 1_1 and/or the DCI format 1_X is 6 bits (e.g., based on the first information and/or the second information), Table 4 may be used for indicating (e.g., determining) the antenna port(s) (i.e., DMRS port(s) in Table 4) (e.g., the index of the antenna port(s), the number of antenna port(s)). For example, in a case that 6 bits (e.g., 4 bits field of) DCI used for indicating the antenna port(s) is set to a value of "15", the UE 102 may receive the DMRS for the PDSCH using the antenna port(s) with the index "4" (i.e., the DMRS port(s)=4).

Additionally or alternatively, as described above, 0 bit may be configured (e.g., indicated, defined) for the number of bits for the DCI used for indicating the antenna port(s) included in the DCI format 1_X. For example, in a case that the number of bits for the DCI used for indicating the antenna port(s) is 0 bit (e.g., the DCI used for indicating the antenna port(s) is not present in the DCI format 1_X, the DCI used for indicating the antenna port(s) is absent in the DCI format 1_X), the UE 102 may receive the DMRS for the PDSCH using the antenna port(s) with the index of "a first predetermined value(s)". For example, the first predetermined value(s) may be specified (e.g., defined) by the specifications, and known information between the gNB 160 and the UE 102. For example, the first predetermined value(s) may be "0". Namely, for example, in a case that the number of bits for the DCI used for indicating the antenna port(s) is 0 bit, the UE 102 may receive the DMRS for the PDSCH using the antenna port(s) with the index "0". Here, as an example, "0" is described as the first predetermined value(s), however, it is obvious that a value(s) other than "0" may be the first predetermined value(s).

Additionally or alternatively, in a case that the number of bits for the DCI used for indicating the antenna port(s) included in the DCI format 1_1 and/or the DCI format 1_X is 0 bit, the UE 102 may receive the DMRS for the PDSCH using the antenna port(s) with the index of "a value(s) corresponding to a second predetermined value(s) in a corresponding Table (e.g., Table 1, 2, 3, or 4)". For example, the second predetermined value(s) may be specified (e.g., defined) by the specifications, and known information between the gNB 160 and the UE 102. For example, the second predetermined value(s) may be "0 (e.g., a value of the lowest row index)" in Table 1, 2, 3, or 4. Also, for example, the second predetermined value(s) may be "a value of the highest row index" in Table (e.g., value of "11" in Table 1, value(s) of "30" and/or "3" in Table 2, value(s) of "23" and/or "1" in Table 3, and/or value(s) of "57" and/or "5" in Table 4). As described above, Table may be configured (e.g., determined, selected) based on the first information and/or the second information. For example, in a case that Table 2 is configured (e.g., based on the first information and the second information) and the number of bits for the DCI used for indicating the antenna port(s) is configured as "0" bit, the UE 102 may receive the DMRS for the PDSCH using the antenna port(s) with the index "0" (i.e., which is corresponding to value of "0" in Table 2) for one codeword (i.e., codeword 0 enabled, codeword 1 disabled). Additionally or alternatively, in a case that Table 2 is configured (e.g., based on the first information and the second information) and the number of bits for the DCI used for indicating the antenna port(s) is configured as "0" bit, the UE 102 may receive the DMRS for the PDSCH using the antenna port(s) with the index "0-4" (i.e., which is corresponding to value of "0" in Table 2) for two codewords (i.e., codeword 0 enabled, codeword 1 enabled).

Additionally or alternatively, in a case that the number of bits for the DCI used for indicating the antenna port(s) is 0 bit, the UE 102 may receive the DMRS for the PDSCH using the antenna port(s) with the index of "a value(s) configured by the gNB 160". For example, the gNB 160 may transmit, by using the RRC message (e.g., the dedicated RRC message), information (e.g., thirteenth information) used for indicating the antenna port(s) (e.g., the index of the antenna port(s), the number of antenna port(s)). Namely, in a case that the number of bits for the DCI used for indicating the antenna port(s) is 0 bit, the UE 102 may receive the DMRS for the PDSCH using the antenna port(s) with the index of "a value(s) configured by using the thirteenth information". Namely, the antenna port(s) configured by using the thirteenth information may be used for the case that the number of bits for the DCI used for indicating the antenna port(s) is 0 bit.

As described above, in a case that the number of bits for the DCI used for indicating the antenna port(s) is 0 bit, the UE 102 may receive the DMRS for the PDSCH using the antenna port(s) with the index which is determined based on a predetermined way. Similarly, in a case that the number of bits for the DCI used for indicating the antenna port(s) is 0 bit, the gNB 160 may transmit the DMRS for the PDSCH using the antenna port(s) with the index which is determined based on a predetermined way. Here, the predetermined way may be specified by the specification, and known information between the gNB 160 and the UE 120.

A sequence generation for the DMRS for the PDSCH is described here. The UE 102 may assume the sequence of the DMRS for the PDSCH is generated as below. Regarding demodulation reference signals (DMRS(s)) for PDSCH sequence generation, the UE may assume the sequence r(n) is defined by $$r(n) = \frac{1}{\sqrt{2}}(1 - 2 \cdot c(2n)) + j\frac{1}{\sqrt{2}}(1 - 2 \cdot c(2n+1)),$$

where the pseudo-random sequence c(i) is defined in clause 5.2.1. The pseudo-random sequence generator may be initialized with $$c_{init}=(2^{17}(N_{symb}^{slot}n_{s,f}^{\mu}+l+1)(2N_{ID}^{nSCID}+1)+2N_{ID}^{nSCID}+n_{SCID}) \bmod 2^{31},$$

where l is the OFDM symbol number within the slot, $n_{s,f}^{\mu}$ is the slot number within a frame.

$N_{ID}^0, N_{ID}^1 \in \{0, 1, \ldots, 65535\}$ may be given by using the information (e.g., scramblingID0) (e.g., as described above) and/or the information (e.g., scramblingID1), respectively, in the DMRS-DownlinkConfig IE if provided and the PDSCH is scheduled by PDCCH using DCI format 1_1 (e.g., the DCI format 1_1 with the CRC scrambled by the C-RNTI, the MCS-C-RNTI, the first RNTI, and/or the CS-RNTI).

$N_{ID}^0, N_{ID}^1 \in \{0, 1, \ldots, 65535\}$ may be given by using the information (e.g., scramblingID0) (e.g., as described above) and the information (e.g., scramblingID1), respectively in the DMRS-DownlinkConfig IE if provided and the PDSCH is scheduled by PDCCH using DCI format 1_X (e.g., the DCI format 1_X with the CRC scrambled by the C-RNTI, the MCS-C-RNTI, the first RNTI, and/or the CS-RNTI) (e.g., if the number of bits for the DCI used for indicating the DMRS sequence initialization is "1" bits (i.e., if the number of bits for the DCI used for indicating the DMRS sequence initialization is not "0" bit)).

$N_{ID}^0 \in \{0, 1, \ldots, 65535\}$ may be given by the information (e.g., scramblingID0) (e.g., as described above) in the DMRS-DownlinkConfig IE if provided and the PDSCH is scheduled by PDCCH using DCI format 1_0 (e.g., the DCI format 1_0 with the CRC scrambled by the C-RNTI, the MCS-C-RNTI, the first RNTI, and/or the CS-RNTI).

$N_{ID}^{nSCID}=N_{ID}^{cell}$ otherwise (e.g., there may be "exceptions", as described in detail below).

Here, the quantity $n_{SCID} \in \{0,1\}$ may be indicated by using the DCI used for indicating the DMRS sequence initialization (i.e., the DM-RS sequence initialization field) included in the DCI format 1_1 which is used for scheduling of the PDSCH transmission (i.e., the DCI format 1_1 associated with the PDSCH transmission), otherwise $n_{SCID}=0$.

Additionally or alternatively, the quantity $n_{SCID} \in \{0,1\}$ may be given by the DCI used for indicating the DMRS sequence initialization (i.e., the DM-RS sequence initialization field) included in the DCI format 1_X which is used for scheduling of the PDSCH transmission (i.e., the DCI format 1_X associated with the PDSCH transmission). Here, in this case, the number of bits for the DCI used for indicating the DMRS sequence initialization may be "1" bit (i.e., may not be "0" bit).

Regarding pseudo-random sequence generation, generic pseudo-random sequences may be defined by a length-31 Gold sequence. The output sequence c(n) of length $M_{PN}$, where n=0,1, ... , $M_{PN}-1$, may be defined by $$c(n) = (x_1(n + N_C) + x_2(n + N_C)) \bmod 2$$

$$x_1(n + 31) = (x_1(n + 3) + x_1(n)) \bmod 2$$

$$x_2(n + 31) = (x_2(n + 3) + x_2(n + 2) + x_2(n + 1) + x_2(n))\bmod 2$$

where $N_C=1600$ and the first m-sequence $x_1(n)$ may be initialized with $x_1(0)=1$, $x_1(n)=0$, n=1, 2, ... , 30. The initialization of the second m-sequence, $x_2(n)$, may be denoted by $c_{init}=\Sigma_{i=0}^{30} x_2(i) \cdot 2^i$ with the value depending on the application of the sequence.

As described above, in a case that the PDSCH is scheduled by using the DCI format 1_1 (e.g., the DCI format 1_1 with the CRC scrambled by the C-RNTI, the MCS-C-RNTI, the first RNTI, and/or the CS-RNTI), the UE 102 may assume that the sequence of the DMRS for the PDSCH is generated based on the DCI used for indicating the DMRS sequence initialization (i.e., which is included in the DCI format 1_1). Here, as described above, the number of bits for the DCI used for indicating the DMRS sequence initialization may be always 1 bit. Namely, the DCI used for indicating the DMRS sequence initialization included in the DCI format 1_1 may be used for indicating either one of $n_{SCID}=0$ or $n_{SCID}=1$. Here, $n_{SCID}=0$ may be corresponding to the information (e.g., scramblingID0). Also, $n_{SCID}=1$ may be corresponding to the information (e.g., scramblingID1). Namely, the UE 102 may determine (e.g., select) a value of the scrambling identity (e.g., a value of scramblingID0 or a value of scramblingID1) based on the value of $n_{SCID}$. And, the UE 102 may assume that the sequence of the DMRS for the PDSCH is generated based on at least the value of the scrambling identity and the value of $n_{SCID}$.

Additionally or alternatively, in a case that the PDSCH is scheduled by using the DCI format 1_X (e.g., the DCI format 1_X with the CRC scrambled by the C-RNTI, the MCS-C-RNTI, the first RNTI, and/or the CS-RNTI), the UE 102 may assume that the sequence of the DMRS for the PDSCH is generated based on the DCI used for indicating the DMRS sequence initialization (i.e., which is included in the DCI format 1_X). Here, in this case, the number of bits for the DCI used for indicating the DMRS sequence initialization may be 1 bit (i.e., 1 bits is configured as the number of bits for the DCI used for indicating the DMRS sequence initialization included in the DCI format 1_X). Namely, the DCI used for indicating the DMRS sequence initialization included in the DCI format 1_X may be used for indicating either one of $n_{SCID}=0$ or $n_{SCID}=1$. Here, $n_{SCID}=0$ may be corresponding to the information (e.g., scramblingID0). Also, $n_{SCID}=1$ may be corresponding to the information (e.g., scramblingID1). Namely, the UE 102 may determine (e.g., select) a value of the scrambling identity (e.g., a value of scramblingID0 or a value of scramblingID1) based on the value of $n_{SCID}$. And, the UE 102 may assume that the sequence of the DMRS for the PDSCH is generated based on at least the value of the scrambling identity and/or the value of $n_{SCID}$.

Additionally or alternatively, in a case that the PDSCH is scheduled by using the DCI format 1_0 (e.g., the DCI format 1_0 with the CRC scrambled by the C-RNTI, the MCS-C-RNTI, the first RNTI, and/or the CS-RNTI), the UE 102 may assume that the sequence of the DMRS for the PDSCH is generated based on the information (e.g., scramblingID0) (i.e., the value of the scramblingID0). Additionally or alternatively, $n_{SCID}=0$ may be used for generation of the sequence of the DMRS for the PDSCH. Also, as described above, the DCI format 1_0 may not include the DCI used for indicating the DMRS sequence initialization (i.e., the field of the DCI used for indicating the DMRS sequence initialization).

Additionally or alternatively, in a case that the information (e.g., scramblingID0) and/or the information (e.g., scramblingID0) is(are) not configured (i.e., otherwise, as described above), the UE 102 may assume that the sequence of the DMRS for the PDSCH is generated based on the physical cell identity. Additionally or alternatively, $n_{SCID}=0$ may be used for the generation of the sequence of the DMRS for the PDSCH. Namely, in a case that the information (e.g., scramblingID0) and/or the information (e.g., scramblingID0) is(are) absent (i.e., in a case that no value of the information (e.g., scramblingID0) and/or no value of the information (e.g., scramblingID0) is(are) configured), the UE 102 may assume that the sequence of the DMRS for the PDSCH is generated based on the physical cell identity.

Additionally or alternatively, in a case that the number of bits for the DCI used for indicating the DMRS sequence initialization is configured as "0" bits (i.e., otherwise, as described above), the UE 102 may assume that the sequence of the DMRS for the PDSCH is generated based on the physical cell identity. Additionally or alternatively, $n_{SCID}=0$ may be used for the generation of the sequence of the DMRS for the PDSCH. Namely, in a case that the number of bits for the DCI used for indicating the DMRS sequence initialization is configured as "0" bits, the physical cell identity may be used for the generation of the sequence of the DMRS for the PDSCH.

Additionally or alternatively, in a case that the number of bits for the DCI used for indicating the DMRS sequence initialization is configured as "0" bits, the UE 102 may assume that the sequence of the DMRS for the PDSCH is generated based on $n_{scm}$ which is configured by using the gNB 160 (i.e., "exceptions", as described above). For example, the gNB 160 may transmit, by using the RRC message (e.g., the dedicated RRC message), information (e.g., fourteenth information) used for indicating $n_{SCID}$ (e.g., 0 or 1 (i.e., a value of a parameter related to the DMRS for the PDSCH, a value of a parameter related to the scrambling identity)). Namely, the UE 102 may determine (e.g., select) a value of the scrambling identity (e.g., a value of scramblingID0 or a value of scramblingID1) based on the value of $n_{SCID}$ which is configured by the gNB. And, the UE 102 may assume that the sequence of the DMRS for the PDSCH is generated based on at least the value of the scrambling identity and/or the value of $n_{SCID}$ which is configured by the gNB.

Additionally or alternatively, in a case that the number of bits for the DCI used for indicating the DMRS sequence initialization is configured as "0" bits, the UE 102 may assume that the sequence of the DMRS for the PDSCH is generated based on the scrambling identity (scramblingID0, or scramblingID1, or scramblingID2) which is configured by the gNB 160. As described above, the gNB 160 may transmit, by using the RRC message, the information (scramblingID0) and/or the information (scramblingID1). Additionally or alternatively, the gNB 160 may transmit, by using the RRC message, information (scramblingID2, fifteenth information). Here, the fifteenth information may be included in the DMRS-DownlinkConfig IE. Additionally or alternatively, $n_{SCID}=0$ may be used for the generation of the sequence of the DMRS for the PDSCH. Namely, in a case that the number of bits for the DCI used for indicating the DMRS sequence initialization is configured as "0" bits, the scrambling identity (scramblingID0, or scramblingID1, or scramblingID2) configured by the gNB 160 may be used for the generation of the sequence of the DMRS for the PDSCH.

As described above, in a case that the number of bits for the DCI used for indicating the DMRS sequence initialization is 0 bit, the UE 102 may assume that the sequence of the DMRS for the PDSCH is generated based on a parameter(s) (e.g., $n_{SCID}$, the information (e.g., scramblingID0), the information (e.g., scramblingID1), and/or the information (e.g., scramblingID2)) which is determined based on a predetermined way. Similarly, in a case that the number of bits for the DCI used for indicating the DMRS sequence initialization is 0 bit, the gNB 102 may generate the sequence of the DMRS for the PDSCH based on a parameter(s) (e.g., $n_{SCID}$, the information (e.g., scramblingID0), the information (e.g., scramblingID1), and/or the information (e.g., scramblingID2)) which is determined based on a predetermined way. Here, the predetermined way may be specified by the specification, and known information between the gNB 160 and the UE 120.

Figure 6:
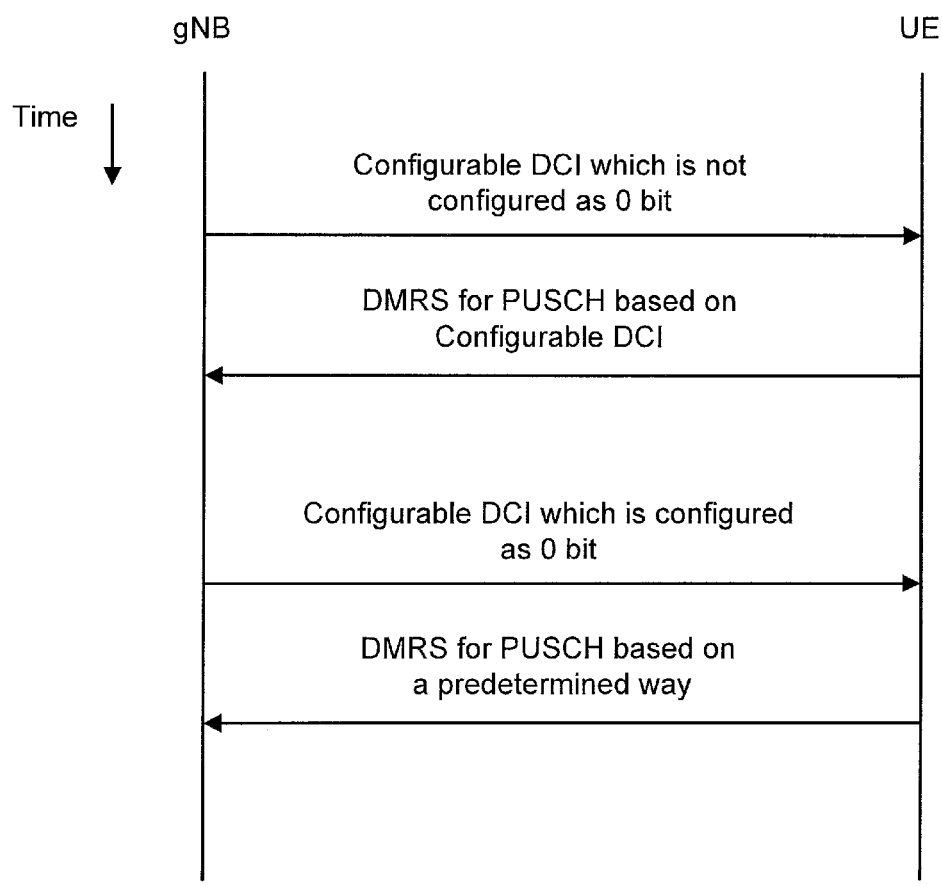
FIG. 6 illustrates an example of uplink transmissions.

FIG. 6 illustrates an example of uplink transmissions. As shown by FIG. 6, the UE 102 may transmit the DMRS for the PUSCH using the antenna port(s) (i.e., the uplink antenna port(s)). Here, as described above, the antenna port(s) for the DMRS for the PUSCH may be indicated by using the DCI used for indicating the antenna port(s) included in the DCI format 0_1 and/or the DCI format 0_Y. Also, as described above, the number of bits for the DCI used for indicating the antenna port(s) included in the DCI format 0_1 and/or the DCI format 0_Y may be configurable.

As described above, for example, in a case that the number of bits for the DCI used for indicating the antenna port(s) included in the DCI format 0_1 and/or the DCI format 0_Y is 2 bits (e.g., based on the fifth information, the sixth information, the seventh information, and/or the eighth information), Table 5 may be used for indicating (e.g., determining) the antenna port(s) (i.e., DMRS port(s) in Table 5) (e.g., the index of the antenna port(s), the number of antenna port(s)). For example, in a case that 2 bits (e.g., 2 bits field of) DCI used for indicating the antenna port(s) is set to a value of "3", the UE 102 may transmit the DMRS for the PUSCH using the antenna port(s) with the index "3" (i.e., the DMRS port(s)=3).

Additionally or alternately, for example, in a case that the number of bits for the DCI used for indicating the antenna port(s) included in the DCI format 0_1 and/or the DCI format 0_Y is 5 bits (e.g., based on the fifth information, the sixth information, the seventh information, and/or the eighth information), Table 8 may be used for indicating (e.g., determining) the antenna port(s) (i.e., DMRS port(s) in Table 8) (e.g., the index of the antenna port(s), the number of antenna port(s)). For example, in a case that 5 bits (e.g., 5 bits field of) DCI used for indicating the antenna port(s) is set to a value of "16", the UE 102 may transmit the DMRS for the PUSCH using the antenna port(s) with the index "4" (i.e., the DMRS port(s)=4).

Additionally or alternatively, as described above, 0 bit may be configured (e.g., indicated, defined) for the number of bits for the DCI used for indicating the antenna port(s) included in the DCI format 1_X. For example, in a case that the number of bits for the DCI used for indicating the antenna port(s) is 0 bit (e.g., the DCI used for indicating the antenna port(s) is not present in the DCI format 1_X, the DCI used for indicating the antenna port(s) is absent in the DCI format 1_X), the UE 102 may transmit the DMRS for the PUSCH using the antenna port(s) with the index of "a third predetermined value(s)". Here, the third predetermined value(s) may be the same as the first predetermined value(s). Namely, in a case that the number of bits for the DCI for indicating the antenna port(s) included in the DCI format 1_1, 1_X, 0_1, and/or 0_Y, the same predetermined value(s) (e.g., for the first predetermined value(s) and the third predetermined value(s)) may be used for the antenna port(s) for the DMRS for PDSCH and the antenna port(s) for the DMRS for the PUSCH. For example, the third predetermined value(s) may be specified (e.g., defined) by the specifications, and known information between the gNB 160 and the UE 102. For example, the third predetermined value(s) may be "0". Namely, for example, in a case that the number of bits for the DCI used for indicating the antenna port(s) is 0 bit, the UE 102 may transmit the DMRS for the PUSCH using the antenna port(s) with the index "0". Here, as an example, "0" is described as the third predetermined value(s), however, it is obvious that a value(s) other than "0" may be the third predetermined value(s).

Additionally or alternatively, in a case that the number of bits for the DCI used for indicating the antenna port(s) included in the DCI format 0_1 and/or the DCI format 0_Y is 0 bit, the UE 102 may receive the DMRS for the PDSCH using the antenna port(s) with the index of "a value(s) corresponding to a fourth predetermined value(s) (e.g., a fourth predetermined row index) in a corresponding Table (e.g., Table 1, 2, 3, or 4)". Here, the fourth predetermined value(s) may be the same as the second predetermined value(s). Namely, in a case that the number of bits for the DCI for indicating the antenna port(s) included in the DCI format 1_1, 1_X, 0_1, and/or 0_Y, the same predetermined value(s) (e.g., for the second predetermine value(s) and the fourth predetermined value(s)) may be used for the antenna port(s) for the DMRS for PUSCH and the antenna port(s) for the DMRS for the PUSCH.

For example, the fourth predetermined value(s) may be specified (e.g., defined) by the specifications, and known information between the gNB 160 and the UE 102. For example, the fourth predetermined value(s) may be "0 (e.g., a value of the lowest row index)" in Table 5, 6, 7, or 8. Also, for example, the fourth predetermined value(s) may be "a value of the highest row index" in Table (e.g., the value of "3" in Table 5, the value(s) of "5" in Table 6, the value(s) of "11" and/or "7" in Table 7, and/or the value(s) of "27" and/or "7" in Table 8). As described above, Table may be configured (e.g., determined, selected) based on the fifth information, the sixth information, the seventh information, and/or the eighth information.

Additionally or alternatively, in a case that the number of bits for the DCI used for indicating the antenna port(s) is 0 bit, the UE 102 may transmit the DMRS for the PUSCH using the antenna port(s) with the index of "a value(s) configured by the gNB 160". For example, the gNB 160 may transmit, by using the RRC message (e.g., the dedicated RRC message), information (e.g., sixteenth information) used for indicating the antenna port(s) (e.g., the index of the antenna port(s), the number of antenna port(s)). Namely, in a case that the number of bits for the DCI used for indicating the antenna port(s) is 0 bit, the UE 102 may transmit the DMRS for the PUSCH using the antenna port(s) with the index of "a value(s) configured by using the sixteenth information". Namely, the antenna port(s) configured by using the sixteenth information may be used for the case that the number of bits for the DCI used for indicating the antenna port(s) is 0 bit.

As described above, in a case that the number of bits for the DCI used for indicating the antenna port(s) is 0 bit, the UE 102 may transmit the DMRS for the PUSCH using the antenna port(s) with the index which is determined based on a predetermined way. Similarly, in a case that the number of bits for the DCI used for indicating the antenna port(s) is 0 bit, the gNB 160 may assume the DMRS for the PUSCH is transmitted using the antenna port(s) with the index which is determined based on a predetermined way. Here, the predetermined way may be specified by the specification, and known information between the gNB 160 and the UE 120.

A sequence generation for the DMRS for the PUSCH is described here. The UE 102 may generate the sequence of the DMRS for the PUSCH as below. As described below, different methods for the generation of the sequence for the DMRS for the PUSCH may be used based on whether the transform precoder is disabled or enabled.

Demodulation reference signal for PUSCH sequence generation is also described. Regarding sequence generation, when transform precoding is disabled, if transform precoding for PUSCH is not enabled, the sequence r(n) may be generated according to $$r(n) = \frac{1}{\sqrt{2}}(1 - 2 \cdot c(2n)) + j\frac{1}{\sqrt{2}}(1 - 2 \cdot c(2n+1)),$$

where the pseudo-random sequence c(i) is defined in clause 5.2.1. The pseudo-random sequence generator may be initialized with $$c_{init} = (2^{17}(N_{symb}^{slot} n_{s,f}^\mu + l + 1)(2N_{ID}^{nSCID} + 1) + 2N_{ID}^{nSCID} + n_{SCID}) \bmod 2^{31},$$

where l is the OFDM symbol number within the slot, $n_{s,f}^\mu$ is the slot number within a frame.

$N_{ID}^0, N_{ID}^1 \in \{0, 1, \ldots, 65535\}$ may be given by the information (e.g., scramblingID0) and the information (e.g., scramblingID1), respectively, in the DMRS-UplinkConfig IE if provided and the PUSCH is scheduled by the DCI format 0_1 (e.g., the DCI format 0_1 with the CRC scrambled by the C-RNTI, the MCS-C-RNTI, the first RNTI, and/or the CS-RNTI).

$N_{ID}^0, N_{ID}^1 \in \{0, 1, \ldots, 65535\}$ may be given by the information (e.g., scramblingID0) and the information (e.g., scramblingID1), respectively, in the DMRS-UplinkConfig IE if provided and the PUSCH is scheduled by the DCI format 0_Y (e.g., the DCI format 0_Y with the CRC scrambled by the C-RNTI, the MCS-C-RNTI, the first RNTI, and/or the CS-RNTI) (e.g., if the number of bits for the DCI used for indicating the DMRS sequence initialization is "1" bits (i.e., if the number of bits for the DCI used for indicating the DMRS sequence initialization is not "0" bit)).

$N_{ID}^0 \in \{0, 1, \ldots, 65535\}$ may be given by the information (e.g., scramblingID0) in the DMRS-UplinkConfig IE if provided and the PUSCH is scheduled by the DCI format 0_0 (e.g., the DCI format 0_0 with the CRC scrambled by the C-RNTI, the MCS-C-RNTI, the first RNTI, and/or CS-RNTI).

$N_{ID}^{nSCID} = N_{ID}^{cell}$ otherwise (e.g., there may be "exceptions", as described in detail below).

Here, the quantity $n_{SCID} \in \{0,1\}$ may be indicated by using the DCI used for indicating the DMRS sequence initialization (e.g., the DM-RS initialization field) included in the DCI format 0_1 which is used for scheduling of the PUSCH transmission (i.e., the DCI format 0_1 associated with the PUSCH transmission), otherwise $n_{SCID}=0$.

Additionally or alternatively, the quantity $n_{SCID} \in \{0,1\}$ may be given by the DCI used for indicating the DMRS sequence initialization (i.e., the DM-RS sequence initialization field) included in the DCI format 0_Y which is used for scheduling of the PUSCH transmission (i.e., the DCI format 0_Y associated with the PUSCH transmission). Here, in this case, the number of bits for the DCI used for indicating the DMRS sequence initialization may be "1" bit (i.e., may not be "0" bit).

Sequence generation when transform preceding is enabled is also described. If transform preceding for PUSCH is enabled, the reference-signal sequence r(n) may be generated according to $$r(n) = r_{u,v}^{(\alpha, \delta)}(n)$$

$$n = 0, 1, \ldots, M_{sc}^{PUSCH}/2^\delta - 1$$

where $r_{u,v}^{(\alpha,\delta)}(m)$ may be given by clause 5.2.2 with $\delta=1$ and $\alpha=0$ for a PUSCH transmission.

The sequence group, $u=(f_{gh}+n_{ID}^{RS})\mod 30$, where $n_{ID}^{RS}$ may be given by:

$n_{ID}^{RS}=n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR UL grant nor scheduled by DCI format 0_0 with CRC scrambled by TC-RNTI according to clause 8.3 in [5, TS 38.213].

$n_{ID}^{RS}=N_{ID}^{cell}$ otherwise, where $f_{gh}$ and the sequence number v may be given by:

if neither group, nor sequence hopping is enabled $$f_{gh}=0$$

$$v=0$$

if group hopping is enabled and sequence hopping is disabled $$f_{gh}=(\Sigma_{m=0}^{7}2^m c(8(N_{symb}^{slot}n_{s,f}^{\mu}+l)+m))\mod 30$$

$$v=0$$

where the pseudo-random sequence c(i) is defined by clause 5.2.1 and shall be initialized with $c_{init}=\lfloor n_{ID}^{RS}/30 \rfloor$ at the beginning of each radio frame if sequence hopping is enabled and group hopping is disabled $$f_{gh}=0$$

$$v=\begin{cases}c(N_{symb}^{slot}n_{s,f}^{\mu}+l) & \text{if } M_{ZC}\geq 6N_{sc}^{RB}\\ 0 & \text{otherwise}\end{cases}$$

where the pseudo-random sequence c(i) is defined by clause 5.2.1 and shall be initialized with $c_{init}=n_{ID}^{RS}$ at the beginning of each radio frame.

The hopping mode is controlled by higher-layer parameters:

for PUSCH transmission scheduled by RAR UL grant or by DCI format 0_0 with CRC scrambled by TC-RNTI, sequence hopping is disabled and group hopping is enabled or disabled by the higher-layer parameter groupHoppingEnabledTransformPrecoding;

for all other transmissions, sequence hopping and group hopping are enabled or disabled by the respective higher-layer parameters sequenceHopping and sequenceGroupHopping if these parameters are provided, otherwise, the same hopping mode as for Msg3 shall be used.

Low-PAPR sequence generation is also described. The low-PAPR sequence $r_{u,v}^{(\alpha,\delta)}(n)$ is defined by a cyclic shift $\alpha$ of a base sequence $\bar{r}_{u,v}(n)$ according to $$r_{u,v}^{(\alpha,\delta)}(n)=e^{j\alpha n}\bar{r}_{u,v}(n), 0\leq n < M_{ZC}$$

where $M_{ZC}=mN_{sc}^{RB}/2^{\delta}$ is the length of the sequence. Multiple sequences are defined from a single base sequence through different values of $\alpha$ and $\delta$.

Base sequences $\bar{r}_{u,v}(n)$ are divided into groups, where $u\in\{0, 1, \ldots, 29\}$ is the group number and v is the base sequence number within the group, such that each group contains one base sequence (v=0) of each length $M_{ZC}=mN_{sc}^{RB}/2^{\delta}$, $\frac{1}{2}\leq m/2^{\delta}\leq 5$ and two base sequences (v=0, 1) of each length $M_{ZC}=m N_{sc}^{RB}/2^{\delta}$, $6\leq m/2^{\delta}$. The definition of the base sequence $\bar{r}_{u,v}(0), \ldots, \bar{r}_{u,v}(M_{ZC}-1)$ depends on the sequence length $M_{ZC}$.

As described above, in a case that the PUSCH is scheduled by using the DCI format 0_1 (e.g., the DCI format 0_1 with the CRC scrambled by the C-RNTI, the MCS-C-RNTI, the first RNTI, and/or the CS-RNTI), the UE 102 may generate the sequence of the DMRS for the PUSCH based on the DCI used for indicating the DMRS sequence initialization (i.e., which is included in the DCI format 0_1). Here, as described above, the number of bits for the DCI used for indicating the DMRS sequence initialization may be always 1 bit. Namely, the DCI used for indicating the DMRS sequence initialization included in the DCI format 0_1 may be used for indicating either one of $n_{SCID}$ or $n_{SCID}=1$. Here, $n_{SCID}=0$ may be corresponding to the information (e.g., scramblingID0). Also, $n_{SCID}=1$ may be corresponding to the information (e.g., scramblingID1). Namely, the UE 102 may determine (e.g., select) a value of the scrambling identity (e.g., a value of scramblingID0 or a value of scramblingID1) based on the value of $n_{SCID}$. And, the UE 102 may generate the sequence of the DMRS for the PUSCH based on at least the value of the scrambling identity and the value of $n_{SCID}$.

Additionally or alternatively, in a case that the PUSCH is scheduled by using the DCI format 0_Y (e.g., the DCI format 0_Y with the CRC scrambled by the C-RNTI, the MCS-C-RNTI, the first RNTI, and/or the CS-RNTI), the UE 102 may generate the sequence of the DMRS for the PUSCH based on the DCI used for indicating the DMRS sequence initialization (i.e., which is included in the DCI format 0_Y). Here, in this case, the number of bits for the DCI used for indicating the DMRS sequence initialization may be 1 bit (i.e., 1 bits is configured as the number of bits for the DCI used for indicating the DMRS sequence initialization included in the DCI format 0_Y). Namely, the DCI used for indicating the DMRS sequence initialization included in the DCI format 0_Y may be used for indicating either one of $n_{SCID}=0$ or $n_{SCID}=1$. Here, $n_{SCID}=0$ may be corresponding to the information (e.g., scramblingID0). Also, $n_{SCID}=1$ may be corresponding to the information (e.g., scramblingID1). Namely, the UE 102 may determine (e.g., select) a value of the scrambling identity (e.g., a value of scramblingID0 or a value of scramblingID1) based on the value of $n_{SCID}$. And, the UE 102 may generate the sequence of the DMRS for the PUSCH based on at least the value of the scrambling identity and/or the value of $n_{SCID}$.

Additionally or alternatively, in a case that the PUSCH is scheduled by using the DCI format 0_0 (e.g., the DCI format 0_0 with the CRC scrambled by the C-RNTI, the MCS-C-RNTI, the first RNTI, and/or the CS-RNTI), the UE 102 may generate the sequence of the DMRS for the PUSCH based on the information (e.g., scramblingID0) (i.e., the value of the scramblingID0). Additionally or alternatively, $n_{SCID}=0$ may be used for generation of the sequence of the DMRS for the PUSCH. Also, as described above, the DCI format 0_0 may not include the DCI used for indicating the DMRS sequence initialization (i.e., the field of the DCI used for indicating the DMRS sequence initialization).

Additionally or alternatively, in a case that the information (e.g., scramblingID0) and/or the information (e.g., scramblingID0) is(are) not configured (i.e., otherwise, as described above), the UE 102 may generate the sequence of the DMRS for the PUSCH based on the physical cell identity. Additionally or alternatively, $n_{SCID}=0$ may be used for the generation of the sequence of the DMRS for the PUSCH. Namely, in a case that the information (e.g., scramblingID0) and/or the information (e.g., scramblingID0) is(are) absent (i.e., in a case that no value of the information (e.g., scramblingID0) and/or no value of the information (e.g., scramblingID0) is(are) configured), the UE 102 may generate the sequence of the DMRS for the PUSCH based on the physical cell identity.

Additionally or alternatively, in a case that the number of bits for the DCI used for indicating the DMRS sequence initialization is configured as "0" bits (i.e., otherwise, as described above), the UE 102 may generate the sequence of the DMRS for the PUSCH based on the physical cell identity. Additionally or alternatively, $n_{SCID}=0$ may be used for the generation of the sequence of the DMRS for the PUSCH. Namely, in a case that the number of bits for the DCI used for indicating the DMRS sequence initialization is configured as "0" bits, the physical cell identity may be used for the generation of the sequence of the DMRS for the PUSCH.

Additionally or alternatively, in a case that the number of bits for the DCI used for indicating the DMRS sequence initialization is configured as "0" bits, the UE 102 may generate the sequence of the DMRS for the PUSCH based on $n_{SCID}$ which is configured by using the gNB 160 (i.e., "exceptions", as described above). For example, the gNB 160 may transmit, by using the RRC message (e.g., the dedicated RRC message), information (e.g., seventeen information) used for indicating $n_{SCID}$ (e.g., 0 or 1 (i.e., a value of a parameter related to the DMRS for the PUSCH, a value of a parameter related to the scrambling identity)). Namely, the UE 102 may determine (e.g., select) a value of the scrambling identity (e.g., a value of scramblingID0 or a value of scramblingID1) based on the value of $n_{SCID}$ which is configured by the gNB. And, the UE 102 may generate the sequence of the DMRS for the PUSCH based on at least the value of the scrambling identity and/or the value of $n_{SCID}$ which is configured by the gNB.

Additionally or alternatively, in a case that the number of bits for the DCI used for indicating the DMRS sequence initialization is configured as "0" bits, the UE 102 generate the sequence of the DMRS for the PUSCH based on the scrambling identity (scramblingID0, or scramblingID1, or scramblingID2) which is configured by the gNB 160. As described above, the gNB 160 may transmit, by using the RRC message, the information (scramblingID0) and/or the information (scramblingID1). Additionally or alternatively, the gNB 160 may transmit, by using the RRC message, information (scramblingID2, eighteenth information). Here, the eighteenth information may be included in the DMRS-UplinkConfig IE. Additionally or alternatively, $n_{SCID}=0$ may be used for the generation of the sequence of the DMRS for the PUSCH. Namely, in a case that the number of bits for the DCI used for indicating the DMRS sequence initialization is configured as "0" bits, the scrambling identity (scramblingID0, or scramblingID1, or scramblingID2) configured by the gNB 160 may be used for the generation of the sequence of the DMRS for the PUSCH.

As described above, in a case that the number of bits for the DCI used for indicating the DMRS sequence initialization is 0 bit, the UE 102 may generate the sequence of the DMRS for the PUSCH based on a parameter(s) (e.g., $n_{SCID}$, the information (e.g., scramblingID0), the information (e.g., scramblingID1), and/or the information (e.g., scramblingID2)) which is determined based on a predetermined way. Similarly, in a case that the number of bits for the DCI used for indicating the DMRS sequence initialization is 0 bit, the gNB 102 may assume that the sequence of the DMRS for the PUSCH is generated based on a parameter(s) (e.g., $n_{SCID}$, the information (e.g., scramblingID0), the information (e.g., scramblingID1), and/or the information (e.g., scramblingID2)) which is determined based on a predetermined way.

Here, the predetermined way may be specified by the specification, and known information between the gNB 160 and the UE 120.

Figure 7:
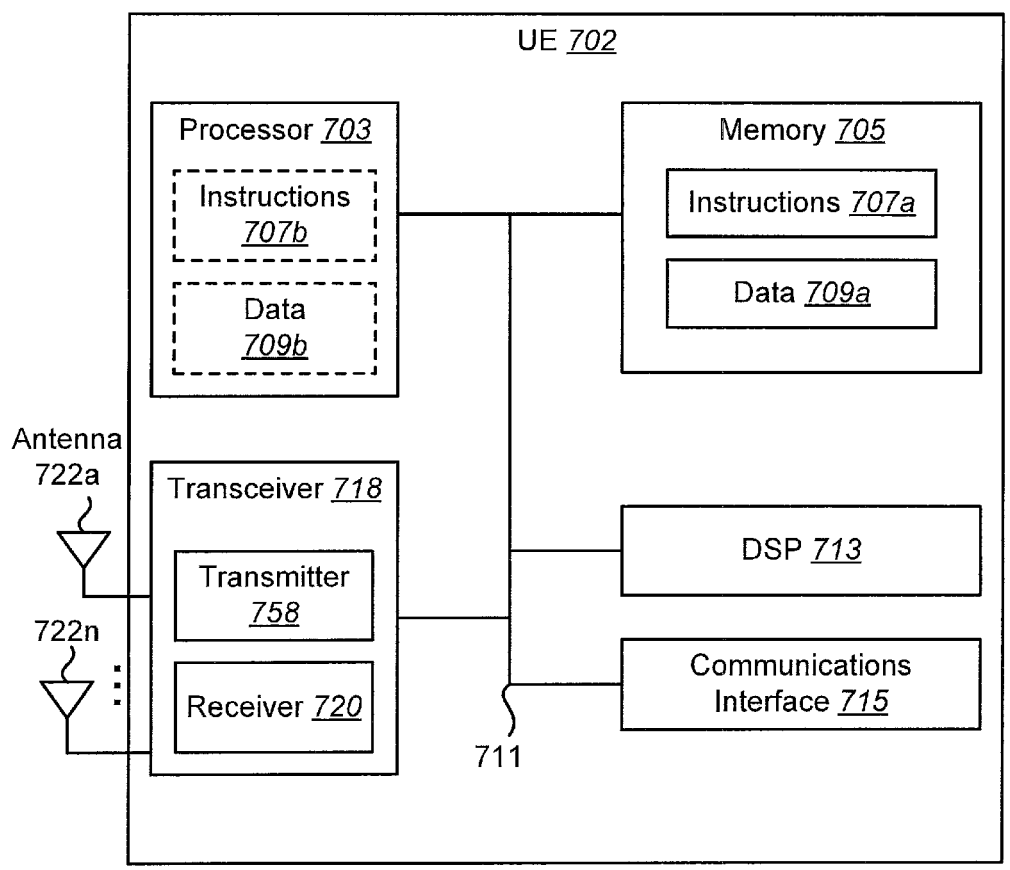
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random access memory (NVRAM). Instructions 707b and data 709b may also reside in the processor 703. Instructions 707b and/or data 709b loaded into the processor 703 may also include instructions 707a and/or data 709a from memory 705 that were loaded for execution or processing by the processor 703. The instructions 707b may be executed by the processor 703 to implement the methods described herein.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 711, which may include a power bus, a control signal bus and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
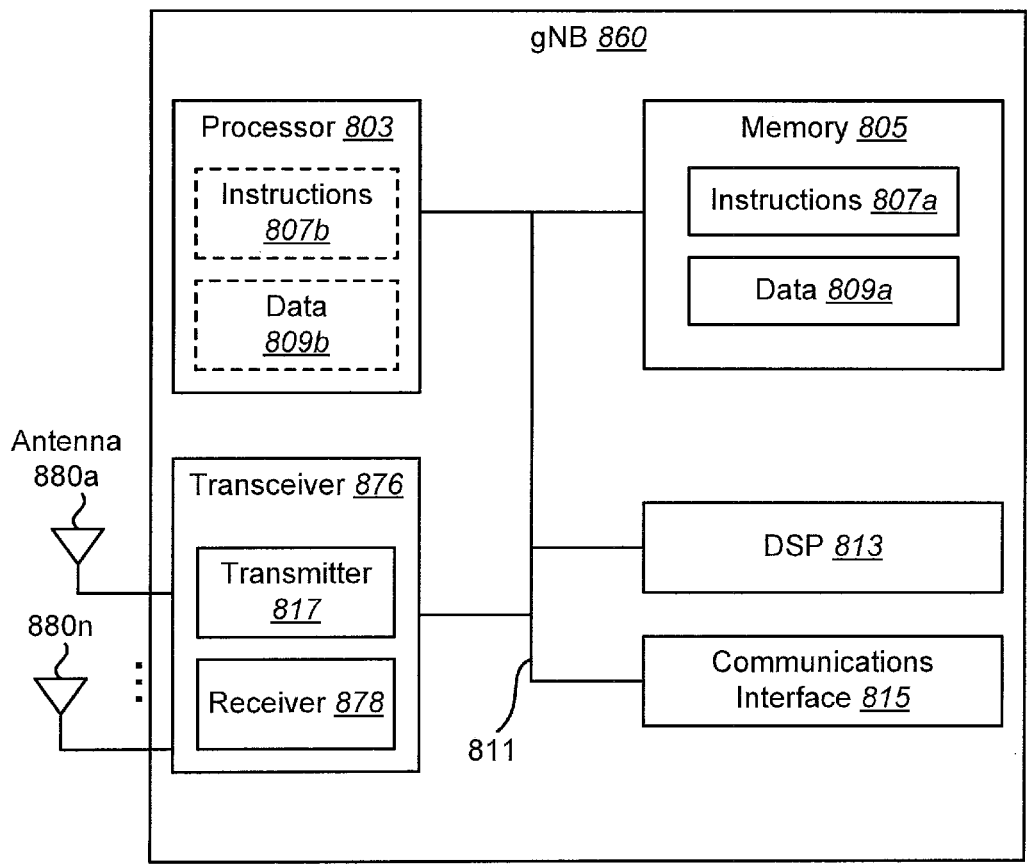
FIG. 8 illustrates various components that may be utilized in a gNB.

FIG. 8 illustrates various components that may be utilized in a gNB 860. The gNB 860 described in connection with FIG. 8 may be implemented in accordance with the gNB 160 described in connection with FIG. 1. The gNB 860 includes a processor 803 that controls operation of the gNB 860. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described herein.

The gNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880a-n are attached to the housing and electrically coupled to the transceiver 876.

The various components of the gNB 860 are coupled together by a bus system 811, which may include a power bus, a control signal bus and a status signal bus, in addition to a data bus. However, for the sake of clarity, the various buses are illustrated in FIG. 8 as the bus system 811. The gNB 860 may also include a digital signal processor (DSP) 813 for use in processing signals. The gNB 860 may also include a communications interface 815 that provides user access to the functions of the gNB 860. The gNB 860 illustrated in FIG. 8 is a functional block diagram rather than a listing of specific components.

Figure 9:
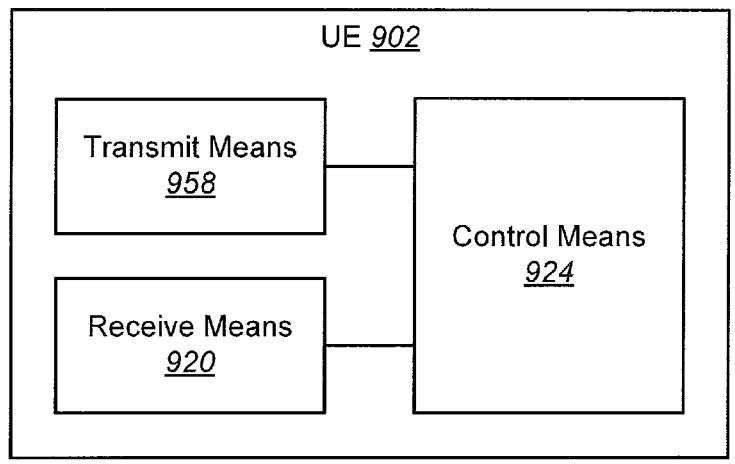
FIG. 9 is a block diagram illustrating one implementation of a UE in which one or more of the systems and/or methods described herein may be implemented.

FIG. 9 is a block diagram illustrating one implementation of a UE 902 in which one or more of the systems and/or methods described herein may be implemented. The UE 902 includes transmit means 958, receive means 920 and control means 924. The transmit means 958, receive means 920 and control means 924 may be configured to perform one or more of the functions described in connection with FIG. 1 above. FIG. 7 above illustrates one example of a concrete apparatus structure of FIG. 9. Other various structures may be implemented to realize one or more of the functions of FIG. 1. For example, a DSP may be realized by software.

Figure 10:
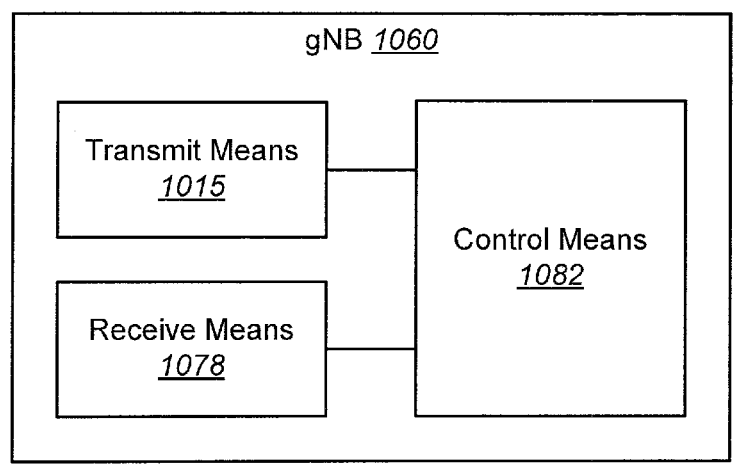
FIG. 10 is a block diagram illustrating one implementation of a gNB in which one or more of the systems and/or methods described herein may be implemented.

FIG. 10 is a block diagram illustrating one implementation of a gNB 1060 in which one or more of the systems and/or methods described herein may be implemented. The gNB 1060 includes transmit means 1017, receive means 1078 and control means 1082. The transmit means 1017, receive means 1078 and control means 1082 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
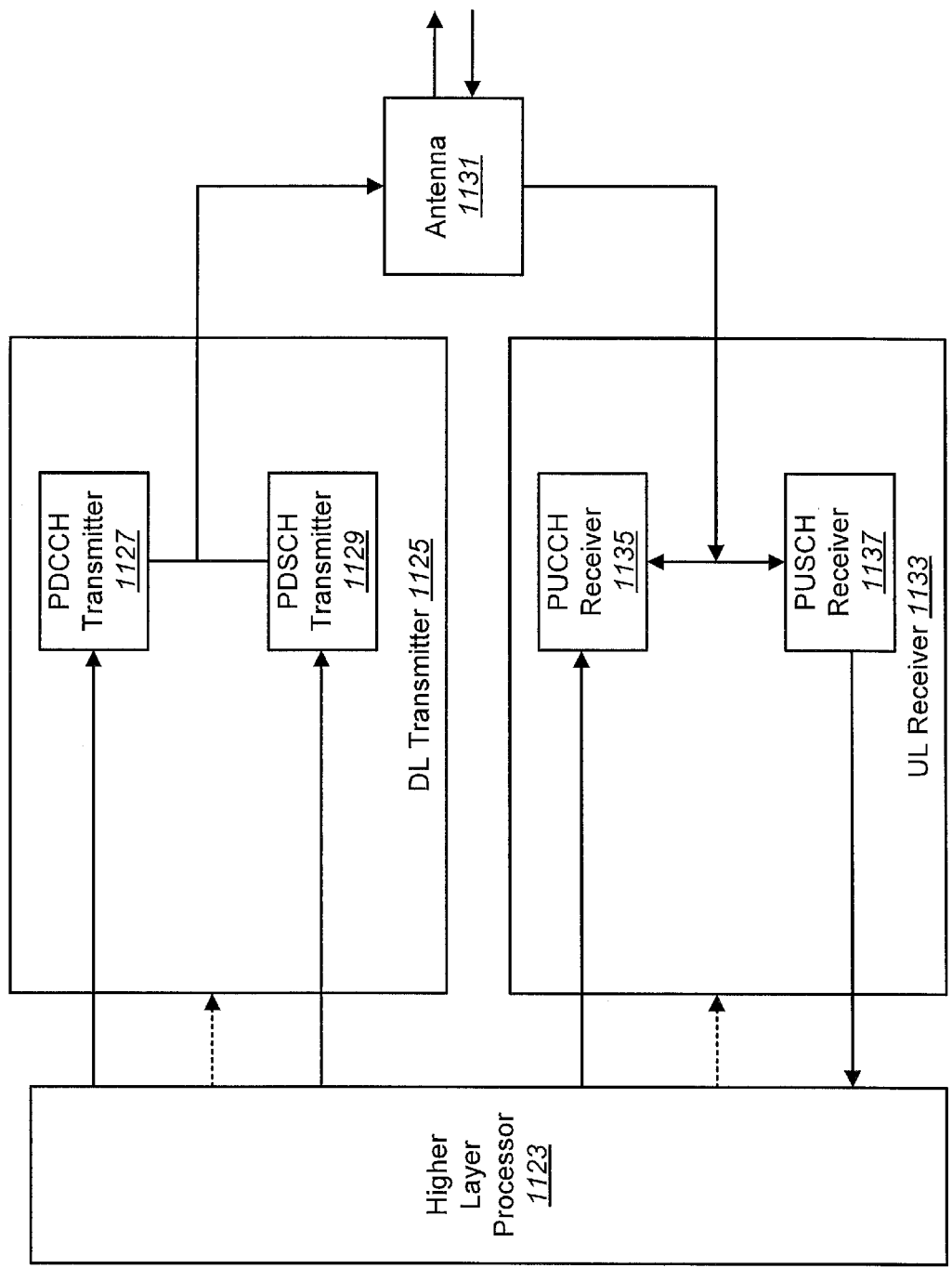
FIG. 11 is a block diagram illustrating one implementation of a gNB.

FIG. 11 is a block diagram illustrating one implementation of a gNB 1160. The gNB 1160 may be an example of the gNB 160 described in connection with FIG. 1. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
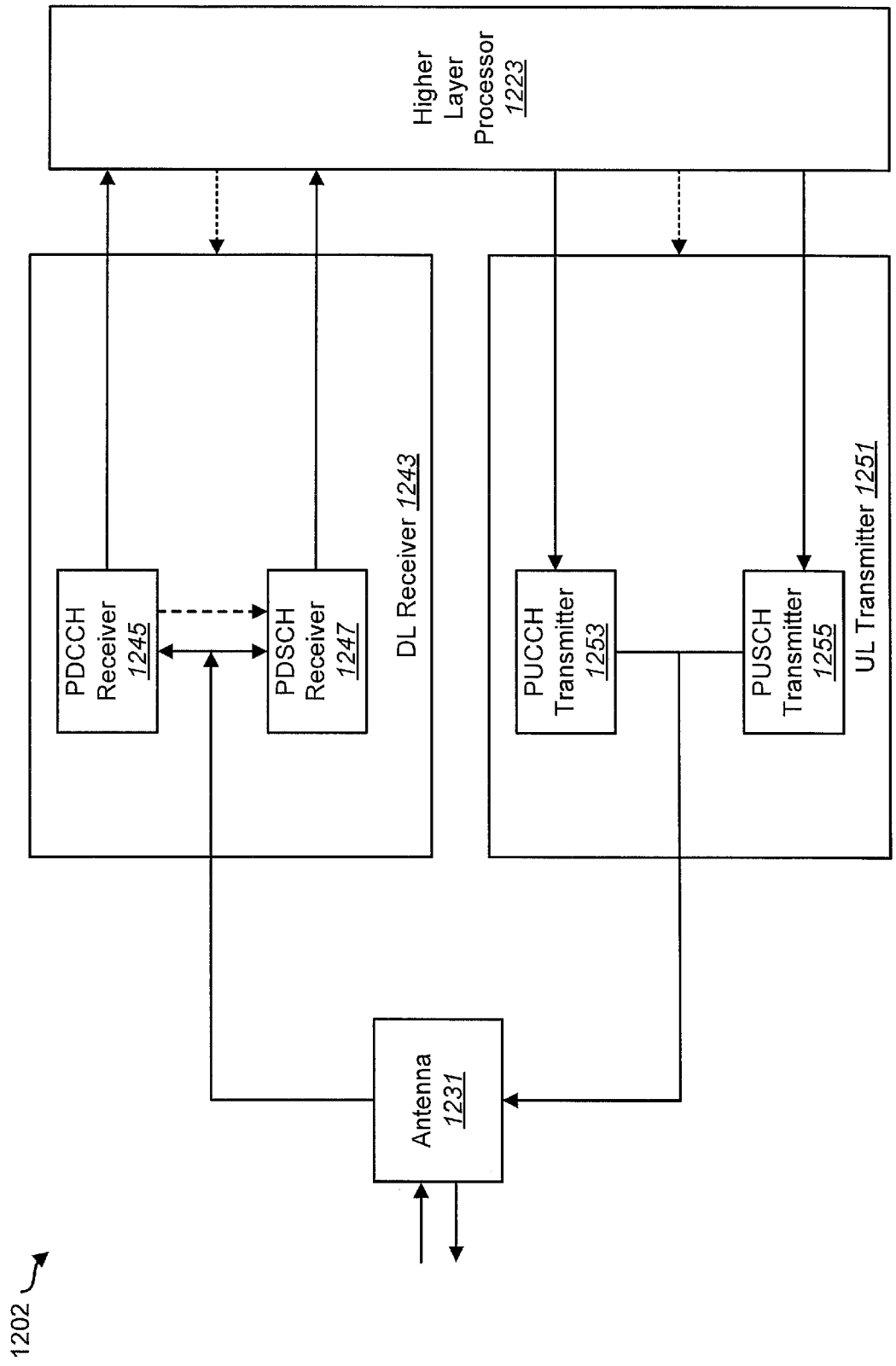
FIG. 12 is a block diagram illustrating one implementation of a UE.

FIG. 12 is a block diagram illustrating one implementation of a UE 1202. The UE 1202 may be an example of the UE 102 described in connection with FIG. 1. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

As described herein, some methods for the DL and/or UL transmissions may be applied (e.g., specified). Here, the combination of one or more of the some methods described herein may be applied for the DL and/or UL transmission. The combination of the one or more of the some methods described herein may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above.

Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a micro-controller, or a state machine. The general-purpose processor or each circuit described herein may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

SUMMARY

In one example, a user equipment (UE) comprises: receiving circuitry configured to receive a radio resource control (RRC) message comprising first information used for indicating an index of an uplink antenna port(s), the receiving circuitry configured to receive on a physical downlink control channel (PDCCH), downlink control information (DCI) format comprising DCI used for indicating an index of the uplink antenna port(s), the DCI format being used for scheduling of a physical uplink shared channel (PUSCH), transmitting circuitry configured to transmit demodulation reference signal (DMRS) for the PUSCH, wherein in a case that a number of bits for the DCI used for indicating the index of the uplink antenna port(s) is more than 1 bit, the transmitting circuitry is configured to transmit the DMRS for the PUSCH using the uplink antenna port(s) indicated by using the DCI used for indicating the index of the uplink antenna port(s), and in a case that the number of bits for the DCI used for indicating the index of the uplink antenna port(s) is 0 bit, the transmitting circuitry is configured to transmit the DMRS for the PUSCH using the uplink antenna port(s) configured by using the first information.

In one example, a base station apparatus comprises: transmitting circuitry configured to transmit a radio resource control (RRC) message comprising first information used for indicating an index of an uplink antenna port(s), the transmitting circuitry configured to transmit on a physical downlink control channel (PDCCH), downlink control information (DCI) format comprising DCI used for indicating an index of the uplink antenna port(s), the DCI format being used for scheduling of a physical uplink shared channel (PUSCH), receiving circuitry configured to receive demodulation reference signal (DMRS) for the PUSCH, wherein in a case that a number of bits for the DCI used for indicating the index of the uplink antenna port(s) is more than 1 bit, the receiving circuitry is configured to receive the DMRS for the PUSCH using the uplink antenna port(s) indicated by using the DCI used for indicating the index of the uplink antenna port(s), and in a case that the number of bits for the DCI used for indicating the index of the uplink antenna port(s) is 0 bit, the receiving circuitry is configured to receive the DMRS for the PUSCH using the uplink antenna port(s) configured by using the first information.

In one example, a communication method of a user equipment (UE) comprises: receiving a radio resource control (RRC) message comprising first information used for indicating an index of an uplink antenna port(s), receiving on a physical downlink control channel (PDCCH), downlink control information (DCI) format comprising DCI used for indicating an index of the uplink antenna port(s), the DCI format being used for scheduling of a physical uplink shared channel (PUSCH), and transmitting demodulation reference signal (DMRS) for the PUSCH, wherein in a case that a number of bits for the DCI used for indicating the index of the uplink antenna port(s) is more than 1 bit, transmitting the DMRS for the PUSCH using the uplink antenna port(s) indicated by using the DCI used for indicating the index of the uplink antenna port(s), and in a case that the number of bits for the DCI used for indicating the index of the uplink antenna port(s) is 0 bit, transmitting the DMRS for the PUSCH using the uplink antenna port(s) configured by using the first information.

In one example, a communication method of a base station apparatus comprises: transmitting a radio resource control (RRC) message comprising first information used for indicating an index of an uplink antenna port(s), transmitting on a physical downlink control channel (PDCCH), downlink control information (DCI) format comprising DCI used for indicating an index of the uplink antenna port(s), the DCI format being used for scheduling of a physical uplink shared channel (PUSCH), receiving demodulation reference signal (DMRS) for the PUSCH, wherein in a case that a number of bits for the DCI used for indicating the index of the uplink antenna port(s) is more than 1 bit, receiving the DMRS for the PUSCH using the uplink antenna port(s) indicated by using the DCI used for indicating the index of the uplink antenna port(s), and in a case that the number of bits for the DCI used for indicating the index of the uplink antenna port(s) is 0 bit, receiving the DMRS for the PUSCH using the uplink antenna port(s) configured by using the first information.

In one example, a user equipment (UE) comprises: receiving circuitry configured to receive a radio resource control (RRC) message comprising information used for indicating whether or not an antenna port field is present in a downlink control information (DCI) format, the DCI format being used for scheduling of a physical downlink shared channel (PDSCH); and processing circuitry configured to determine whether or not the information indicates that the antenna port field is present in the DCI format, wherein in a case that the antenna port field is not present in the DCI format, the receiving circuitry is configured to receive the DMRS for the PDSCH using an antenna port(s) with an index value 0 in a corresponding table.

In one example, a base station apparatus comprises: generating circuitry configured to generate a radio resource control (RRC) message comprising information used for indicating whether or not an antenna port field is present in a downlink control information (DCI) format, the DCI format being used for scheduling of a physical downlink shared channel (PDSCH); and transmitting circuitry configured to transmit the RRC message, wherein in a case that the antenna port field is not present in the DCI format, the transmitting circuitry is configured to transmit the DMRS for the PDSCH using an antenna port(s) with an index value 0 in a corresponding table.

In one example, a communication method of a user equipment (UE) comprises: receiving a radio resource control (RRC) message comprising information used for indicating whether or not an antenna port field is present in a downlink control information (DCI) format, the DCI format being used for scheduling of a physical downlink shared channel (PDSCH); and processing circuitry configured to determine whether or not the information indicates that the antenna port field is present in the DCI format wherein in a case that the antenna port field is not present in the DCI format, the receiving circuitry is configured to receive the DMRS for the PDSCH using an antenna port(s) with an index value 0 in a corresponding table.

In one example, a communication method of a base station apparatus comprises: generating circuitry configured to generate a radio resource control (RRC) message comprising information used for indicating whether or not an antenna port field is present in a downlink control information (DCI) format, the DCI format being used for scheduling of a physical downlink shared channel (PDSCH); and transmitting circuitry configured to transmit the RRC message, wherein in a case that the antenna port field is not present in the DCI format, the transmitting circuitry is configured to transmit the DMRS for the PDSCH using an antenna port(s) with an index value 0 in a corresponding table.

The invention claimed is:

1. A user equipment (UE) comprising:
receiving circuitry configured to receive a radio resource control (RRC) message comprising information used for indicating which one of 0, 4, 5, and 6 is a number of bits for an antenna port field in a downlink control information (DCI) format, the DCI format being used for scheduling of a physical downlink shared channel (PDSCH); and
processing circuitry configured to determine, based on the information, whether or not the antenna port field is present in the DCI format, wherein
the receiving circuitry is further configured to receive, based on a determination that the antenna port field is not present in the DCI format, a demodulation reference signal (DMRS) for the PDSCH using an antenna port associated with a DMRS port, the DMRS port being associated with an index value 0 in a corresponding table.

2. A base station apparatus comprising:
generating circuitry configured to generate a radio resource control (RRC) message comprising information used for indicating which one of 0, 4, 5, and 6 is a number of bits for an antenna port field in a downlink control information (DCI) format, the DCI format being used for scheduling of a physical downlink shared channel (PDSCH); and
transmitting circuitry configured to transmit the RRC message, wherein
the transmitting circuitry is further configured to transmit, based on a determination that the antenna port field is not present in the DCI format, a demodulation reference signal (DMRS) for the PDSCH using an antenna port associated with a DMRS port, the DMRS port being associated with an index value 0 in a corresponding table.

3. A communication method performed by a user equipment (UE), the communication method comprising:
receiving a radio resource control (RRC) message comprising information used for indicating which one of 0, 4, 5, and 6 is a number of bits for an antenna port field in a downlink control information (DCI) format, the DCI format being used for scheduling of a physical downlink shared channel (PDSCH);
determining, based on the information, whether or not the antenna port field is present in the DCI format; and
receiving, based on a determination that the antenna port field is not present in the DCI format, a demodulation reference signal (DMRS) for the PDSCH using an antenna port associated with a DMRS port, the DMRS port being associated with an index value 0 in a corresponding table.

4. The UE of claim 1, wherein
the processing circuitry is further configured to determine the corresponding table based on dmrs-Type information and/or maxLength information.

5. The base station of claim 2, wherein
the corresponding table is determined based on dmrs-Type information and/or maxLength information.

* * * * *